US011589372B2

(12) United States Patent
Yang et al.

(10) Patent No.: US 11,589,372 B2
(45) Date of Patent: Feb. 21, 2023

(54) HANDLING COLLISIONS BETWEEN UPLINK DATA REPETITIONS AND AN UPLINK CONTROL TRANSMISSION

(71) Applicant: QUALCOMM Incorporated, San Diego, CA (US)

(72) Inventors: Wei Yang, San Diego, CA (US); Seyed Ali Akbar Fakoorian, San Diego, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/842,336

(22) Filed: Apr. 7, 2020

(65) Prior Publication Data

US 2020/0329486 A1   Oct. 15, 2020

Related U.S. Application Data

(60) Provisional application No. 62/831,702, filed on Apr. 9, 2019.

(51) Int. Cl.
*H04W 72/12* (2009.01)
*H04W 72/04* (2009.01)
(Continued)

(52) U.S. Cl.
CPC ... *H04W 72/1268* (2013.01); *H04W 72/0413* (2013.01); *H04W 72/0446* (2013.01); *H04W 72/14* (2013.01)

(58) Field of Classification Search
None
See application file for complete search history.

(56) References Cited

U.S. PATENT DOCUMENTS 10,079,665 B2 *   9/2018  Papasakellariou ........ H04L 1/08
2016/0218836 A1   7/2016  Yamamoto et al.
(Continued)

FOREIGN PATENT DOCUMENTS

WO   WO-2018143738 A1   8/2018

OTHER PUBLICATIONS

International Search Report and Written Opinion—PCT/US2020/027270—ISA/EPO—dated Jul. 23, 2020.
(Continued)

*Primary Examiner* — Hong S Cho
(74) *Attorney, Agent, or Firm* — Terry Tsai

(57) ABSTRACT

This disclosure describes methods, devices, and systems for techniques related to wireless communications, and more particularly uplink transmissions on one or more of a physical uplink shared channel (PUSCH) and a physical uplink control channel (PUCCH). Generally, the described techniques support handling collisions between PUSCH repetitions and a PUCCH transmission. A user equipment (UE) may identify that uplink control information (UCI) is scheduled for transmission via an uplink control transmission that overlaps with multiple repetitions of an uplink data transmission. The UE may determine, for each of the multiple repetitions, a quantity of resources available for carrying multiplexed uplink control information, generate encoded UCI by encoding the UCI based on the quantity of resources available in each of the multiple repetitions, and multiplex the encoded UCI on at least a portion of the multiple repetitions based on the quantity of resources available in each of the multiple repetitions.

46 Claims, 13 Drawing Sheets

(51) Int. Cl.
  *H04L 1/16*     (2006.01)
  *H04L 1/18*     (2006.01)
  *H04W 72/1268*  (2023.01)
  *H04W 72/0446*  (2023.01)
  *H04W 72/14*    (2009.01)

(56) References Cited

U.S. PATENT DOCUMENTS

| | | | |
|---|---|---|---|
| 2018/0242320 A1 | 8/2018 | Wong et al. | |
| 2020/0045722 A1 | 2/2020 | Bae et al. | |
| 2021/0184819 A1* | 6/2021 | Takeda | H04L 5/0057 |
| 2021/0360610 A1* | 11/2021 | Kim | H04L 1/1861 |
| 2022/0104224 A1* | 3/2022 | Choi | H04L 1/1812 |

OTHER PUBLICATIONS

LG Electronics: "Remaining Issues on UL Data Transmission Procedure", 3GPP Draft; R1-1800382 Remaining Issues on UL Data Transmission Procedure, 3rd Generation Partnership Project (3GPP), Mobile Competence Centre; 650, Route Des Lucioles; F-06921 Sophia-Antipolis Cedex; France, vol. RAN WG1, No. Vancouver, Canada; Dec. 2, 2018-Dec. 6, 2018 Jan. 13, 2018, XP051384837, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], section 3.3 and proposal 14, 13 pages.

* cited by examiner

HANDLING COLLISIONS BETWEEN UPLINK DATA REPETITIONS AND AN UPLINK CONTROL TRANSMISSION

CROSS REFERENCE

The present Application for Patent claims the benefit of U.S. Provisional Patent Application No. 62/831,702 by YANG et al., entitled "HANDLING COLLISIONS BETWEEN UPLINK DATA REPETITIONS AND AN UPLINK CONTROL TRANSMISSION," filed Apr. 9, 2019. Said provisional application is assigned to the assignee hereof, and is expressly incorporated by reference herein as if fully set forth below and for all applicable purposes.

BACKGROUND

The following relates generally to wireless communications, and more specifically to enhanced solutions to handle collisions between physical uplink shared channel (PUSCH) repetitions and a physical uplink control channel (PUCCH) transmission.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless communications system may include a number of base stations or network access nodes, each simultaneously supporting communication for multiple communication devices, which may be otherwise known as user equipments (UEs). As demand for communication efficiency increases, it may be desirable for a wireless communications system to reduce latencies for wireless communications, as well as provide robustness for uplink transmissions. Wireless communication devices may therefore seek improved reliability for uplink transmissions, including PUSCH and PUCCH.

SUMMARY

The described techniques relate to improved methods, systems, devices, and apparatuses that support techniques related to wireless communications, and more particularly uplink transmissions on one or more of a physical uplink shared channel (PUSCH) and a physical uplink control channel (PUCCH). In accordance with some aspects, the described techniques support handling collisions between PUSCH repetitions and a PUCCH transmission. In some examples, the described techniques may include generating encoded uplink control information (UCI) by encoding the UCI based on a quantity of resources available in each PUSCH of multiple PUSCH repetitions. In other examples, the described techniques may include multiplexing the encoded UCI on at least a portion of the multiple PUSCH repetitions based on the quantity of resources available in each of the multiple PUSCH repetitions. In other examples, the described techniques may include splitting the total quantity of resources to be used by the encoded UCI into amounts to be included in each of the multiple PUSCH repetitions.

Additionally, the described techniques may include, in some examples, determining individual quantities of resources to be used by the encoded UCI in each of the multiple PUSCH repetitions. Additionally or alternatively, the described techniques may include determining a total quantity of resources to be used by the encoded UCI based on a sum of individual quantities of resources determined for each of the multiple PUSCH repetitions. In other examples, the described techniques may include multiplexing the UCI on all PUSCH repetitions of the multiple PUSCH repetitions. The described techniques may also include multiplexing the UCI on a first overlapping PUSCH repetition and on all subsequent PUSCH repetitions of the multiple PUSCH repetitions. The described techniques may therefore include features for improved uplink transmissions, increased spectral efficiency and, in some examples, may promote low latency communication associated with uplink transmissions, among other benefits.

A method of wireless communication at a UE is described. The method may include identifying that UCI is scheduled for transmission by the UE via an uplink control transmission that overlaps with multiple repetitions of an uplink data transmission also scheduled by the UE, determining, for each of the multiple repetitions, a quantity of resources available for carrying multiplexed UCI, generating encoded UCI by encoding the UCI based on the quantity of resources available in each of the multiple repetitions, and multiplexing the encoded UCI on at least a portion of the multiple repetitions based on the quantity of resources available in each of the multiple repetitions.

An apparatus for wireless communication is described. The apparatus may include a processor, memory in electronic communication with the processor, and instructions stored in the memory. The instructions may be executable by the processor to cause the apparatus to identify that UCI is scheduled for transmission by the apparatus via an uplink control transmission that overlaps with multiple repetitions of an uplink data transmission also scheduled by the apparatus, determine, for each of the multiple repetitions, a quantity of resources available for carrying multiplexed UCI, generate encoded UCI by encoding the UCI based on the quantity of resources available in each of the multiple repetitions, and multiplex the encoded UCI on at least a portion of the multiple repetitions based on the quantity of resources available in each of the multiple repetitions.

Another apparatus for wireless communication is described. The apparatus may include means for identifying that UCI is scheduled for transmission by the apparatus via an uplink control transmission that overlaps with multiple repetitions of an uplink data transmission also scheduled by the apparatus, determining, for each of the multiple repetitions, a quantity of resources available for carrying multiplexed UCI, generating encoded UCI by encoding the UCI based on the quantity of resources available in each of the multiple repetitions, and multiplexing the encoded UCI on at least a portion of the multiple repetitions based on the quantity of resources available in each of the multiple repetitions.

A non-transitory computer-readable medium storing code for wireless communication at a UE is described. The code may include instructions executable by a processor to identify that UCI is scheduled for transmission by the UE via an uplink control transmission that overlaps with multiple repetitions of an uplink data transmission also scheduled by the UE, determine, for each of the multiple repetitions, a quantity of resources available for carrying multiplexed UCI, generate encoded UCI by encoding the UCI based on the quantity of resources available in each of the multiple repetitions, and multiplex the encoded UCI on at least a portion of the multiple repetitions based on the quantity of resources available in each of the multiple repetitions.

Some examples of the method, apparatuses, and non-transitory computer-readable medium described herein may further include operations, features, means, or instructions for allocating portions of the encoded UCI to different ones of the multiple repetitions for multiplexing.

In some examples of the method, apparatuses, and non-transitory computer-readable medium described herein, allocating portions of the encoded UCI to different ones of the multiple repetitions may include operations, features, means, or instructions for allocating the encoded UCI proportionally to the quantity of resources in each of the multiple repetitions available for carrying multiplexed UCI.

In some examples of the method, apparatuses, and non-transitory computer-readable medium described herein, generating the encoded UCI may include operations, features, means, or instructions for determining a total quantity of resources to be used by the encoded UCI, where the total quantity of resources may be based on a payload size of the UCI before encoding, a payload size of uplink data transmission before encoding, a total number of resources available within the multiple repetitions for data transmission, a ratio of coding rates of the uplink data transmission and the uplink control transmission, and combinations thereof.

In some examples of the method, apparatuses, and non-transitory computer-readable medium described herein, generating the encoded UCI further may include operations, features, means, or instructions for encoding the UCI to a number of encoded bits based on the total quantity of resources.

Some examples of the method, apparatuses, and non-transitory computer-readable medium described herein may further include operations, features, means, or instructions for splitting the total quantity of resources to be used by the encoded UCI into amounts to be included in each of the multiple repetitions, where the amounts may be proportional to the quantity of resources in each of the multiple repetitions available for carrying multiplexed UCI.

Some examples of the method, apparatuses, and non-transitory computer-readable medium described herein may further include operations, features, means, or instructions for partitioning the encoded bits proportionally to the quantity of resources in each of the multiple repetitions available for carrying multiplexed UCI.

In some examples of the method, apparatuses, and non-transitory computer-readable medium described herein, the total quantity of resources to be used by the encoded UCI may be also determined based on a maximum portion of the total number of resources available within the multiple repetitions for data transmission.

In some examples of the method, apparatuses, and non-transitory computer-readable medium described herein, generating the encoded UCI may include operations, features, means, or instructions for determining individual quantities of resources to be used by the encoded UCI in each of the multiple repetitions, and determining a total quantity of resources to be used by the encoded UCI based on a sum of individual quantities of resources determined for each of the multiple repetitions.

In some examples of the method, apparatuses, and non-transitory computer-readable medium described herein, generating the encoded UCI further may include operations, features, means, or instructions for encoding the UCI to a number of encoded bits based on the total quantity of resources.

In some examples of the method, apparatuses, and non-transitory computer-readable medium described herein, determining the individual quantities of resources to be used by the encoded UCI in each of the multiple repetitions may include operations, features, means, or instructions for determining the individual quantities of resources based on a payload size of the UCI before encoding, a payload size of uplink data transmission before encoding, a number of resources available for data transmission within a respective repetition of the multiple repetitions, a ratio of coding rates of the uplink data transmission and the uplink control transmission, and combinations thereof.

Some examples of the method, apparatuses, and non-transitory computer-readable medium described herein may further include operations, features, means, or instructions for splitting the total quantity of resources to be used by the encoded UCI into amounts to be included in each of the multiple repetitions, where the amounts may be based on the individual quantities of resources.

Some examples of the method, apparatuses, and non-transitory computer-readable medium described herein may further include operations, features, means, or instructions for partitioning the encoded bits for inclusion in the multiple repetitions, where the encoded bits may be partitioned based on the individual quantities of resources.

In some examples of the method, apparatuses, and non-transitory computer-readable medium described herein, the total quantity of resources to be used by the encoded UCI may be also determined, for each of the multiple repetitions, based on a maximum portion of the quantity of resources available for carrying multiplexed UCI for respective ones of the multiple repetitions.

In some examples of the method, apparatuses, and non-transitory computer-readable medium described herein, the UCI includes at least one of an acknowledgement or negative acknowledgement feedback information or a channel state information report.

A method of wireless communication at a UE is described. The method may include identifying that the UE is scheduled to transmit a set of repetitions of an uplink data transmission, identifying that UCI is scheduled for transmission by the UE via an uplink control transmission that overlaps with one or more overlapping repetitions of the set of repetitions, determining to multiplex the UCI on one or more selected repetitions of the set of repetitions, and multiplexing the UCI on the one or more selected repetitions.

An apparatus for wireless communication is described. The apparatus may include a processor, memory in electronic communication with the processor, and instructions stored in the memory. The instructions may be executable by the processor to cause the apparatus to identify that the apparatus is scheduled to transmit a set of repetitions of an uplink data transmission, identify that UCI is scheduled for transmission by the apparatus via an uplink control transmission that overlaps with one or more overlapping repetitions of the set of repetitions, determine to multiplex the UCI on one or more selected repetitions of the set of repetitions, and multiplex the UCI on the one or more selected repetitions.

Another apparatus for wireless communication is described. The apparatus may include means for identifying that the apparatus is scheduled to transmit a set of repetitions of an uplink data transmission, identifying that UCI is scheduled for transmission by the apparatus via an uplink control transmission that overlaps with one or more overlapping repetitions of the set of repetitions, determining to multiplex the UCI on one or more selected repetitions of the set of repetitions, and multiplexing the UCI on the one or more selected repetitions.

A non-transitory computer-readable medium storing code for wireless communication at a UE is described. The code may include instructions executable by a processor to identify that the UE is scheduled to transmit a set of repetitions of an uplink data transmission, identify that UCI is scheduled for transmission by the UE via an uplink control transmission that overlaps with one or more overlapping repetitions of the set of repetitions, determine to multiplex the UCI on one or more selected repetitions of the set of repetitions, and multiplex the UCI on the one or more selected repetitions.

In some examples of the method, apparatuses, and non-transitory computer-readable medium described herein, determining to multiplex the UCI on the one or more selected repetitions may be at least partially different from the one or more overlapping repetitions. In some examples of the method, apparatuses, and non-transitory computer-readable medium described herein, determining to multiplex the UCI on the one or more selected repetitions may include operations, features, means, or instructions for determining to multiplex the UCI on all repetitions of the set of repetitions. where In some examples of the method, apparatuses, and non-transitory computer-readable medium described herein, determining to multiplex the UCI on the one or more selected repetitions may include operations, features, means, or instructions for determining to multiplex the UCI on a first of the overlapping repetitions and on all subsequent repetitions of the set of repetitions.

In some examples of the method, apparatuses, and non-transitory computer-readable medium described herein, determining to multiplex the UCI on the one or more selected repetitions may include operations, features, means, or instructions for identifying one or more largest capacity repetitions of the set of repetitions, where the one or more largest capacity repetitions each include a maximum number of resources available for multiplexing of UCI of all of the set of repetitions, and determining to multiplex the UCI on at least one of the one or more of the largest capacity repetitions.

In some examples of the method, apparatuses, and non-transitory computer-readable medium described herein, determining to multiplex the UCI on at least one of the one or more of the largest capacity repetitions may include operations, features, means, or instructions for determining to multiplex the UCI on all of the one or more of the largest capacity repetitions.

In some examples of the method, apparatuses, and non-transitory computer-readable medium described herein, determining to multiplex the UCI on at least one of the one or more of the largest capacity repetitions may include operations, features, means, or instructions for determining to multiplex the UCI on only a first of the one or more of the largest capacity repetitions.

In some examples of the method, apparatuses, and non-transitory computer-readable medium described herein, determining to multiplex the UCI on the one or more selected repetitions may include operations, features, means, or instructions for identifying one or more largest capacity repetitions of the set of repetitions, where the one or more largest capacity repetitions each include a number of resources available for multiplexing of UCI above a predetermined threshold, and determining to multiplex the UCI on only the one or more of the largest capacity repetitions.

In some examples of the method, apparatuses, and non-transitory computer-readable medium described herein, determining to multiplex the UCI on the one or more selected repetitions may include operations, features, means, or instructions for identifying one or more highest effective coding rate repetitions of the set of repetitions, where the one or more highest effective coding rate repetitions each include an effective coding rate above a predetermined threshold, and determining to multiplex the UCI on repetitions that did not include the one or more highest effective coding rate repetitions.

In some examples of the method, apparatuses, and non-transitory computer-readable medium described herein, determining to multiplex the UCI on the one or more selected repetitions may include operations, features, means, or instructions for determining to multiplex the UCI only on repetitions of the set of repetitions that begin at least a predetermined duration of time after receipt by the UE of an uplink grant associated with the uplink control transmission.

In some examples of the method, apparatuses, and non-transitory computer-readable medium described herein, the UCI includes at least an acknowledgement or negative acknowledgement feedback information corresponding to one or more downlink data transmissions scheduled by one or more downlink grants.

In some examples of the method, apparatuses, and non-transitory computer-readable medium described herein, the predetermined duration of time may be a first predetermined duration of time, and where determining to multiplex the UCI on the one or more selected repetitions further may include operations, features, means, or instructions for determining to multiplex the UCI only on repetitions of the set of repetitions that begin at least a second predetermined duration of time after receipt by the UE of a last of the one or more downlink data transmissions.

In some examples of the method, apparatuses, and non-transitory computer-readable medium described herein, determining to multiplex the UCI on the one or more selected repetitions may include operations, features, means, or instructions for determining to multiplex the UCI on only repetitions of the set of repetitions that may be scheduled to be transmitted within a duration of time corresponding to a slot of the uplink control transmission.

Some examples of the method, apparatuses, and non-transitory computer-readable medium described herein may further include operations, features, means, or instructions for determining, for each of the selected repetitions, a quantity of resources available for carrying multiplexed UCI, generating encoded UCI by encoding the UCI based on the quantity of resources available in each of the selected repetitions, and where the UCI that may be multiplexed on the one or more selected repetitions may be the encoded UCI.

Some examples of the method, apparatuses, and non-transitory computer-readable medium described herein may further include operations, features, means, or instructions for allocating portions of the encoded UCI to different ones of the selected repetitions for multiplexing.

In some examples of the method, apparatuses, and non-transitory computer-readable medium described herein, allocating portions of the encoded UCI to different ones of the selected repetitions may include operations, features, means, or instructions for allocating the encoded UCI proportionally to the quantity of resources in each of the selected repetitions available for carrying multiplexed UCI.

DETAILED DESCRIPTION

Figure 1:
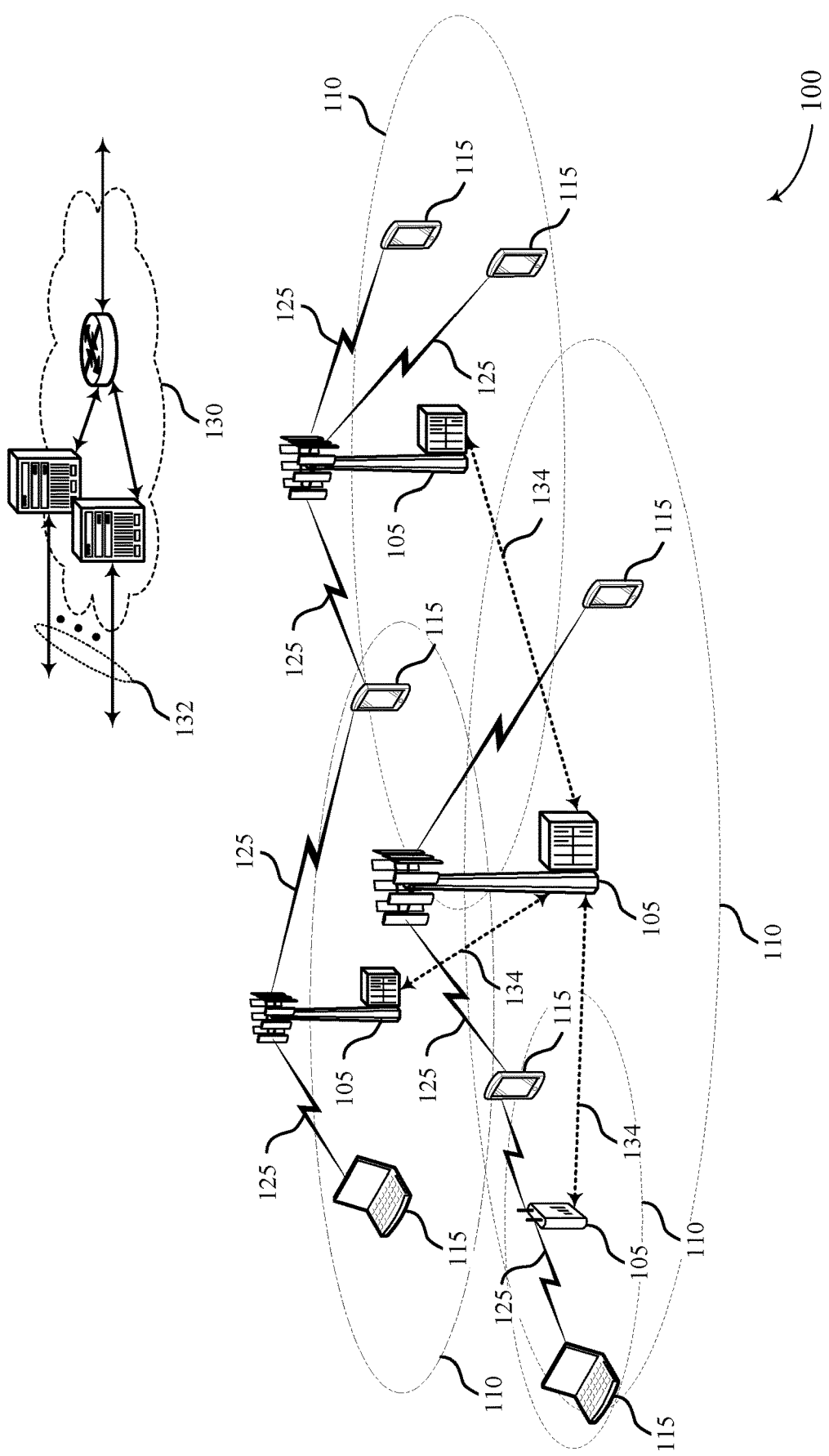
FIGS. 1 and 2 illustrate examples of a wireless communications system that supports enhanced solutions to handle collisions between PUSCH repetitions and a PUCCH transmission in accordance with aspects of the present disclosure.

Some wireless communication systems may have user equipments (UEs) and base stations, for example, next-generation NodeBs or giga-NodeBs (either of which may be referred to as a gNB) that support wireless communications according to one or more radio access technologies, such as fourth generation (4G) systems including Long Term Evolution (LTE) systems, LTE-Advanced (LTE-A) systems, or LTE-A Pro systems, and fifth generation (5G) systems which may be referred to as New Radio (NR) systems. In some wireless communication systems (for example, NR systems), UEs may support repetition of uplink transmissions, such as PUSCH to improve reliability, as well as increase coverage of the uplink transmissions. While repetition of uplink transmissions may improve reliability and increase coverage of such transmissions, in some cases, wireless communications systems may experience collision between uplink physical channels, for example, such as a PUSCH and a PUCCH due to PUSCH repetitions as described herein. These collisions may have an undesirable effect on the wireless communications systems. As demand for communication efficiency increases, it may be desirable for wireless communications systems to support a means for collision management between uplink physical channels, particularly between PUSCH and PUCCH.

As described herein, UEs may support handling collisions between PUSCH and PUCCH, including collision management schemes and communication schemes that support enhanced uplink transmissions, and more specifically improvements in PUSCH and PUCCH reliability. For example, the described techniques may address challenges with one or more of PUSCHs of a PUSCH repetition carrying uplink control information (UCI) of a colliding PUCCH. In some aspects, a UE may generate encoded UCI by encoding the UCI based on a quantity of resources available in each PUSCH of multiple PUSCH repetitions. In other examples, the UE may multiplex the encoded UCI on at least a portion (e.g., one or a portion of one) of the multiple PUSCH repetitions based on the quantity of resources available in each of the multiple PUSCH repetitions. In other examples, the UE may split the total quantity of resources to be used by the encoded UCI into amounts to be included in each of the multiple PUSCH repetitions.

Additionally, the UE may determine individual quantities of resources to be used by the encoded UCI in each of the multiple PUSCH repetitions. Additionally or alternatively, the UE may determine a total quantity of resources to be used by the encoded UCI based on a sum of individual quantities of resources determined for each of the multiple PUSCH repetitions. In other examples, the UE may multiplex the UCI on all PUSCH repetitions of the multiple PUSCH repetitions. The UE may also multiplex the UCI on a first overlapping PUSCH repetition and on all subsequent PUSCH repetitions of the multiple PUSCH repetitions.

Particular aspects of the subject matter described in this disclosure may be implemented to realize one or more of the following potential advantages. The described collision management schemes for handling collisions between PUSCH repetitions and a PUCCH transmission may support improvements in signaling reliability for uplink transmissions, among other advantages. Supported collision management schemes may include features for efficient multiplexing (also referred to herein as "piggybacking") of UCI on PUSCH repetitions. The described techniques may also support increased spectral efficiency and, in some examples, may promote low latency communication of uplink transmissions, among other benefits.

Aspects of the disclosure are initially described in the context of a wireless communications system. Aspects of the disclosure are further described in the context one or more additional wireless communications systems and one or more collision management schemes that relate to aspects for handling collisions between PUSCH repetitions and a PUCCH transmission. Aspects of the disclosure are further illustrated by and described with reference to apparatus diagrams, system diagrams, and flowcharts that relate to several aspects related to collision management between PUSCH repetitions and a PUCCH transmission.

FIG. 1 illustrates an example of a wireless communications system 100 that supports enhanced solutions to handle collisions between PUSCH repetitions and a PUCCH transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some cases, UEs 115 may be designed to support critical functions (for example, mission critical functions), and a wireless communications system 100 may be configured to provide ultra-reliable communications for these functions.

In some cases, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

Base stations 105 and UEs 115 may support wireless communications according to one or more radio access technologies, such as 4G systems and 5G systems. In some examples, base stations 105 may communicate with UEs 115 on one or more downlink physical channels (for example, such as a physical downlink shared channel (PDSCH), a physical downlink control channel (PDCCH), and the like), while UEs 115 may communicate with base stations 105 on one or more uplink physical channels (for example, such as a PUSCH, a PUCCH, and the like). In some examples, PDSCH may carry downlink data, while PDCCH may carry downlink control signaling (for example, downlink control information (DCI)). Similarly, PUSCH may carry uplink data, while PUCCH may carry uplink control signaling (for example, UCI). In some other examples, PUSCH may carry both uplink data, as well as uplink control signaling (for example, UCI).

Base stations 105 may transmit scheduling grants to UEs 115. In some examples, base stations 105 may determine a scheduling grant by scheduling resources (for example, time and frequency resources) for one or more uplink transmissions. In some examples, base stations 105 may allocate a quantity of resource elements or a quantity of resource blocks for one or more uplink transmissions. A resource element may span one symbol by one sub-carrier, while a resource block may span one slot (for example, including multiple symbols) by multiple subcarriers (for example, 12 sub-carriers). In the example of an NR system, a slot may span 14 symbols (for example, 14 OFDM symbols).

An uplink transmission may include one or more of a PUSCH or a PUCCH. In some examples, an uplink transmission may include a PUSCH repetition, which may include a number of repeating PUSCH transmissions over a period (for example, a slot). UEs 115 may support repetition of uplink transmissions (for example, such as PUSCH) to improve reliability. Base stations 105 may configure the number of repetitions for a PUSCH, for example, according to available resources in the wireless communications system 100, or the like. In some examples, base stations 105 may be capable of scheduling PUSCH repetitions over a slot. In other examples, base stations 105 may be unable to schedule PUSCH repetitions within the slot. In some examples, one or more of the PUSCH repetitions may collide with a PUCCH in a slot. In some examples, a numerology associated with transmission of the PUSCH repetitions may be different from a numerology associated with the PUCCH. In other cases, a numerology associated with transmission of the PUSCH repetitions may be the same as a numerology associated with the PUCCH. The collision of one or more of the PUSCH repetitions with a PUCCH may have a negative impact on the wireless communications system 100 (for example, reduced reliability of PUSCH and PUCCH).

Collisions between PUSCH repetitions and PUCCH may occur in various scenarios. For example, PUCCH may be semi-statically configured by higher layer signaling from a base station 105. Subsequent to receiving a semi-static configuration, UE 115 may be required to perform low latency transmissions (for example, related to ultra-reliable communications) having PUSCH repetitions that are scheduled for transmission at a same time as the PUCCH. In some implementations, UE 115 may not be permitted to transmit on two uplink channels (e.g., PUSCH and PUCCH) at the same time. Accordingly, if there is a collision (e.g., a conflict in scheduling transmissions causing at least a partial overlap in resources to be utilized for transmission), UE 115 may have to decide on which uplink channel to transmit (e.g., on PUSCH or PUCCH).

In some examples, to eliminate the adverse impact of the collision on the wireless communications system 100, UCI multiplexed on a PUCCH may be multiplexed on a colliding PUSCH of a PUSCH repetition. UCI may carry several information including one or more of a HARQ acknowledgement, a channel quality indicator (CQI), a precoding matrix indicator (PMI), a rank indicator (RI), or a scheduling request (SR). In some other examples, based on a numerology (for example, sub-carrier spacing and symbol length) of a PUSCH repetition and a PUCCH, a PUCCH within a slot may collide with a PUSCH of a PUSCH repetition in multiple slots. If a PUCCH within a slot collides with a PUSCH of a PUSCH repetition in multiple slots, UCI of the PUCCH may be multiplexed on all colliding PUSCHs. That is, same UCI bits may be repeated on all colliding PUSCH of the PUSCH repetition. Here, each PUSCH of the PUSCH repetition may be handled separately. As a result, there may be no relationship between each PUSCH of the PUSCH repetition for multiplexing (for example, piggybacking) UCI of the colliding PUCCH on each PUSCH of the PUSCH repetition.

In other examples, PUSCHs of a PUSCH repetition may be scheduled in mini-slots. Here, the PUSCHs of the PUSCH repetition may have different resource allocations, coding rates, and the like. In some examples, however, having different resource allocations, coding rates, among other aspects may have a negative consequence on PUSCH and PUCCH reliability. By way of example, base stations 105 may schedule two PUSCH repetitions over a slot. In some examples, however, one of the two PUSCH repetitions may traverse into a subsequent slot, due to a lack of available resources (for example, resource elements) in the scheduled slot. In these examples, UEs 115 may be capable of splitting (also referred to herein as segmenting) the second PUSCH repetition, such that a portion of the second PUSCH repetition spans across the scheduled slot and another portion of the second PUSCH repetition spans across a subsequent slot. Here, UEs 115 may effectively result in transmission of three PUSCH repetitions due to the splitting of the second PUSCH repetition into multiple portions. In some examples, however, a PUCCH may collide with the first PUSCH repetition within the scheduled slot and the portion of the second PUSCH repetition within the scheduled slot, but not the other portion of the second PUSCH repetition that spans across the subsequent slot. Splitting of the PUSCH repetition may therefore result in different resource allocations, coding rates, and the like. In some examples, having different resource allocations, coding rates, among other aspects may have a negative consequence on the split PUSCH repetition.

As described herein, UEs may support handling collisions between PUSCH repetitions and a PUCCH, including collision management schemes and communication schemes that support enhanced uplink transmissions, and more specifically improvements in PUSCH and PUCCH reliability. For example, the described techniques may address challenges with one or more of PUSCHs of a PUSCH repetition multiplexing ("piggybacking") UCI of a colliding PUCCH. In some aspects, UEs 115 may identify that UCI is scheduled for transmission by the UEs 115 via an uplink control transmission that overlaps with multiple repetitions of an uplink data transmission also scheduled by the UEs 115. UEs 115 may determine, for each of the multiple repetitions, a quantity of resources available for carrying multiplexed UCI, and generate encoded UCI by encoding the UCI based on the quantity of resources available in each of the multiple repetitions. UEs 115 may then multiplex the encoded UCI on at least a portion of the multiple repetitions based on the quantity of resources available in each of the multiple repetitions.

The described techniques may provide efficacy to the UEs 115 by reducing or eliminating latencies associated with processes related to collision management schemes for handling collisions between PUSCH repetitions and a PUCCH transmission. Supported collision management schemes may include features for effectively piggybacking UCI over multiple PUSCHs. More specifically, the described collision management schemes may support improvements to reliability of uplink transmissions, among other advantages.

Figure 2:
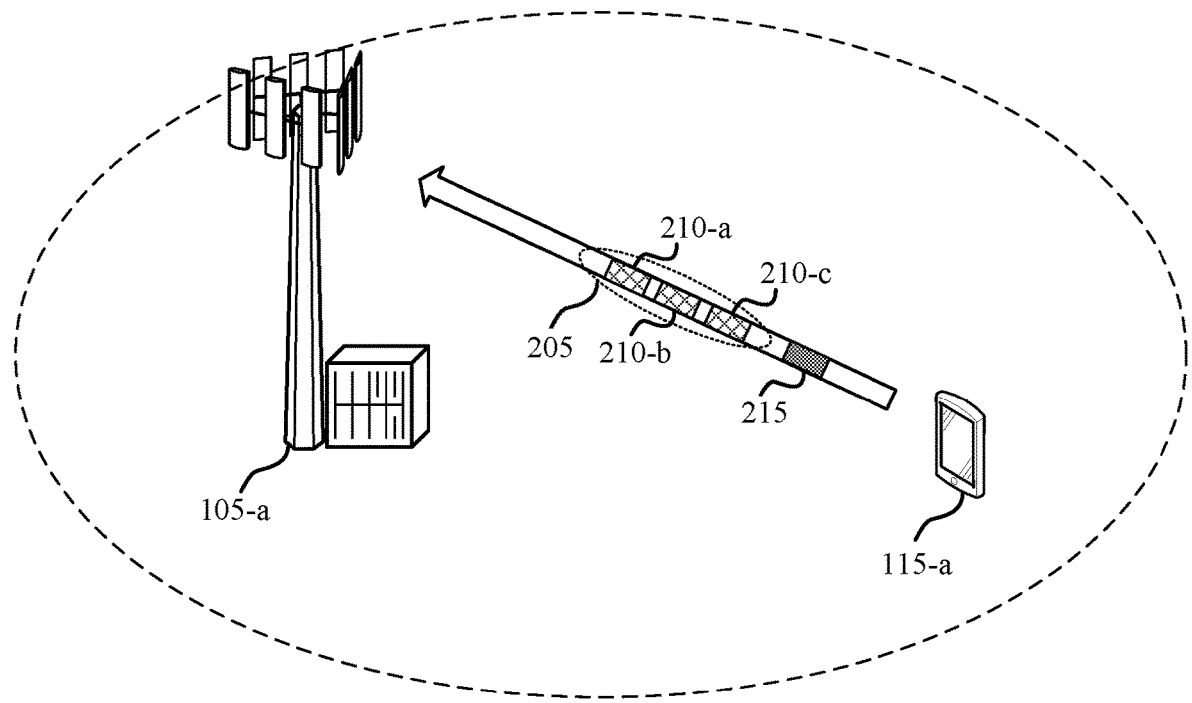

FIG. 2 illustrates an example of a wireless communications system 200 that supports enhanced solutions to handle collisions between PUSCH repetitions and a PUCCH transmission in accordance with aspects of the present disclosure. The wireless communications system 200 may include a base station 105-a and a UE 115-a, which may be examples of the corresponding devices described with reference to FIG. 1. In some examples, the wireless communications system 200 may implement aspects of the wireless communications system 100, as described with reference to FIG. 1. For example, the wireless communications system 200 may support multiple radio access technologies including 5G systems, and more particularly handling collisions between a PUSCH repetition and a PUCCH.

Base station 105-a and UE 115-a may communicate via one or more downlink and uplink physical channels (for example, PDSCH, PDCCH, PUSCH, PUCCH). In some examples, PDSCH may carry downlink data, while PDCCH may carry downlink control signaling (for example, DCI). Similarly, PUSCH may carry uplink data, while PUCCH may carry uplink control signaling (for example, UCI). In other examples, PUSCH may carry both uplink data, as well as uplink control signaling (for example, UCI). UCI may carry certain information including one or more of a HARQ acknowledgement, a CQI, a PMI, or an RI. In some examples, UCI may carry an acknowledgement or negative acknowledgement feedback information corresponding to one or more downlink data transmissions scheduled by one or more downlink grants.

Base station 105-a may, in some examples, transmit scheduling grants to UE 115-a. For example, base station 105-a may schedule time and frequency resources for one or more uplink transmissions (for example, PUSCH, PUCCH). In some examples, base station 105-a may allocate a quantity of resource elements or a quantity of resource blocks for one or more uplink transmissions. A resource element may span one symbol by one sub-carrier, while a resource block may span one slot (for example, including multiple symbols) by multiple subcarriers (for example, 12 sub-carriers). In the example of the wireless communications system 200, a slot may span 14 OFDM symbols.

In some examples, base station 105-a may configure UE 115-a to support multiple PUSCH transmissions (also referred to herein as PUSCH repetitions). An advantage of PUSCH repetitions includes improvements to uplink transmission reliability, as well as increase coverage of uplink transmissions to base station 105-a. An uplink transmission may therefore include a PUSCH repetition, which may include a number of repeating PUSCH transmissions over a temporal period (for example, a slot). In some examples, base stations 105-a may configure a number of repetitions for a PUSCH over one or more slots. By way of example, UE 115-a may support a PUSCH repetition 205, which may include a PUSCH 210-a, a PUSCH 210-b, and a PUSCH 210-c, as well as a PUCCH 215.

One or more of the PUSCH 210 of the PUSCH repetition 205 may collide with the PUCCH 215. The collision of one or more of the PUSCH 210 of the PUSCH repetition 205 with the PUCCH 210 may have a negative impact on the wireless communications system 200 (for example, reduced reliability of the PUSCH 210 and the PUCCH 215 transmission). As described herein, UE 115-a may support handling collisions between the PUSCH 210 and the PUCCH 215, including collision management schemes and communication schemes that support enhanced uplink transmissions, and more specifically improvements in the PUSCH 210 and the PUCCH 215 reliability. For example, the described techniques may address challenges with UE 115-a multiplexing ("piggybacking") a UCI of the colliding PUCCH 215 on one or more of the PUSCH 210 of the PUSCH repetition 205. Beneficially, handling collisions between PUCCH 215 and one or more of the PUSCH 210 may enable efficient operation of a transceiver of the UE 115-a by efficiently and effectively providing UCI to the base station 105-a according to collision management schemes, thereby improving the reliability of subsequent transmissions that may be optimized by the UCI. Examples of collision management schemes are described with reference to FIGS. 3 and 4, and are discussed in more detail herein.

Figure 3:
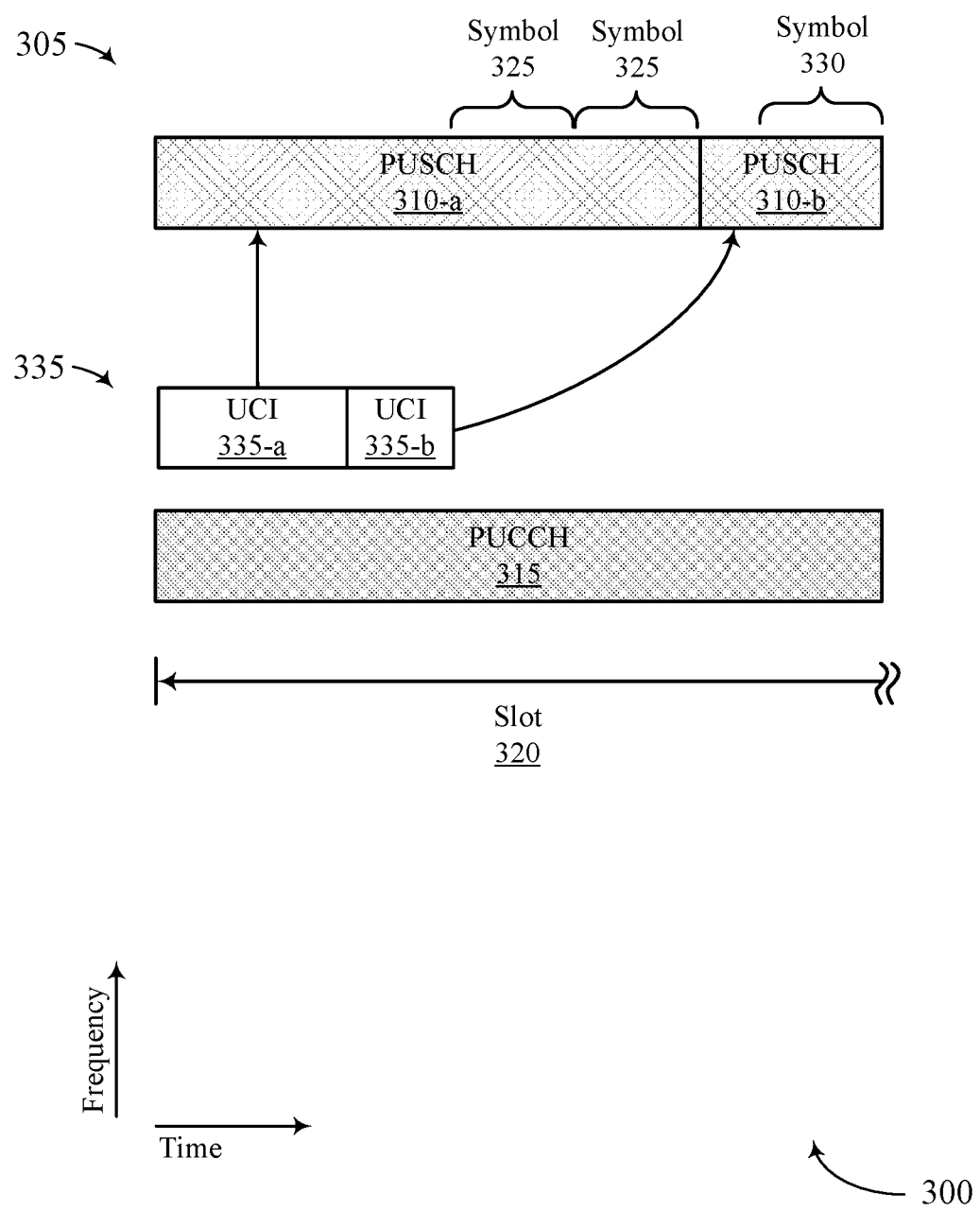
FIGS. 3 and 4 illustrate examples of a collision management scheme that supports enhanced solutions to handle collisions between PUSCH repetitions and a PUCCH transmission in accordance with aspects of the present disclosure.

FIG. 3 illustrates an example of a collision management scheme 300 that supports enhanced solutions to handle collisions between PUSCH repetitions and a PUCCH transmission in accordance with aspects of the present disclosure. In some examples, the collision management scheme 300 may implement aspects of the wireless communications systems 100 and 200, as described with reference to FIGS. 1 and 2. For example, the collision management scheme 300 may be based on a configuration by a base station, and implemented by a UE for handling collisions between PUSCH repetitions and a PUCCH transmission, as described with reference to FIGS. 1 and 2.

In the example of FIG. 3, a PUSCH repetition 305 including a PUSCH 310-a and a PUSCH 310-b, as well as a PUCCH 315 may span a portion or an entirety of a slot 320. The slot 320 may span a number of symbols (for example, x OFDM symbols). In some examples, the PUSCH 310 and the PUCCH 315 may occupy time and frequency resources related to the slot 320, which may include symbol periods, subcarriers, and the like. In some examples, the PUSCH 310-a and the PUSCH 310-b may collide with the PUCCH 315. With reference to FIG. 2, UE 115-a may perform a joint encoding of UCI bits associated with UCI 335 of the PUCCH 310 and split the encoded UCI bits across multiple PUSCH 310 of the PUSCH repetition 305.

By way of example, UE 115-a may identify that UCI 335 is scheduled for transmission by UE 115-a via the PUCCH 315, which may overlap with PUSCH repetition 305 (for example, an uplink data transmission also scheduled by UE 115-a). In some examples, as described further in detail herein, UE 115-a may determine for each of the PUSCH 310 of the PUSCH repetition 305, a quantity of resources available for carrying multiplexed UCI 335, and generate encoded UCI 335 by encoding the UCI 335 based on the quantity of resources available in each PUSCH 310 of the PUSCH repetition 305. UE 115-a may then multiplex the encoded UCI 335 on at least a portion of the one or more PUSCH 310 of the PUSCH repetition 305.

In some examples, UE 115-a may encode UCI 335 and split the encoded UCI 335 into a first encoded UCI 335-a and a second encoded UCI 335-b. In some examples, UE 115-a may encode UCI 335, split the UCI 335 into the first encoded UCI 335-a and the second encoded UCI 335-b, and multiplex (for example, piggyback) the first encoded UCI 335-a on the PUSCH 310-a and the second encoded UCI 335-b on the PUSCH 310-b. One or more of the first encoded UCI 335-a and the second encoded UCI 335-b may include a set of encoded UCI bits. In some examples, the second encoded UCI 335-b may include fewer encoded UCI bits compared to the first encoded UCI 335-a, for example, based on the splitting of resources of the UCI 335, as described herein.

The UCI 335 may, in some examples, have an extended length (for example, resource length, block length). UE 115-a may determine the length (for example, number of resource elements) for UCI 335 based on a length of the one or more PUSCH 310 in the PUSCH repetition 305 (for example, number of resource elements that each PUSCH 310 spans). The length of UCI 335 may therefore be proportional to a length of the one or more colliding PUSCH 310. For example, if the PUSCH 310-a has two symbols 325 (for example, non-demodulation reference signals (nDMRS) OFDM symbols) and the PUSCH 310-b has one symbol 330 (for example, a single nDMRS OFDM symbol), resources of the PUSCH 310-a and the PUSCH 310-b for the UCI 335 may have a resource allocation ratio (or simply a ratio) of 2:1. UE 115-a may therefore determine a ratio of coding rates of the PUSCH 310 and the PUCCH 315 appropriately.

UE 115-a may determine a resource allocation for the UCI 335 (for example, a total quantity of resources, for each PUSCH 310 of the PUSCH repetition 305, available for carrying the UCI 335). In some examples, UE 115-a may determine the resource allocation for the UCI 335, as shown.

$$N_{tot} = \left\lceil \frac{K_{UCI} \cdot M_{tot} \cdot \beta_{offset}}{K_{data}} \right\rceil \quad (1)$$

As part of the Equation (1), shown above, $N_{tot}$ defines the total number of resource elements to be allocated to the UCI 335, $K_{UCI}$ defines the payload size (for example, number of information bits) of the UCI 335 before encoding, $M_{tot}$ defines the total number of resource elements for the PUSCH repetition 305 (for example, PUSCH 310 transmissions excluding DMRS and other reference signals), $K_{data}$ defines a payload size of uplink data before encoding the PUSCH 310, and $\beta_{offset}$ defines a parameter signaled from base station 105-a to UE 115-a to indicate a coding ratio between uplink data carried in the PUSCH repetition 305 and UCI 335. $\beta_{offset}$ may define a ratio of coding rates of uplink data transmission and uplink control transmission. In some examples, the value of $\beta_{offset}$ may be a positive value, and greater than one ($\beta_{offset} > 1$).

Following the above calculations, UE 115-a may determine a number of available resource elements for PUSCH 310 transmissions, as shown.

$$M_{tot} = \Sigma M_j \quad (2)$$

As part of the Equation (2), shown above, $M_j$ defines the number of available resource elements, excluding reference signal resource elements, in the $j^{th}$ PUSCH (for example, PUSCH 310 transmissions excluding DMRS and other reference signals). UE 115-a may split the $N_{tot}$ (for example, the total number of resource elements) allocated to the UCI 335, as shown.

$$N_{tot} = \Sigma N_j \quad (3)$$

As part of the Equation (3), shown above, $N_j$ defines the number of resource elements for the split UCI 335, in the $j^{th}$ PUSCH. For example, UE 115-a may split the encoded UCI 335 into a first encoded UCI 335-a and a second encoded UCI 335-b according to Equation (3). In some examples, $N_j$ may be proportional to $M_j$. In some other examples, UE 115-a may perform a modulo operation on Equations (2) and (3) to achieve integer values for $N_j$ and $M_j$. After splitting the total number of resource elements allocated to the UCI 335 according to Equation (3), UE 115-a may piggyback $N_j$ coded symbols to the corresponding PUSCH 310. For example, UE 115-a may encode UCI 335 (for example, UCI bits), split the UCI 335 into UCI 335-a and UCI 335-b, and multiplex the first encoded UCI 335-a on the PUSCH 310-a and multiplex the second encoded UCI 335-b on the PUSCH 310-b. Thus, UE 115-a may split a total quantity of resources to be used by the encoded UCI 335 into amounts to be included in each of the multiple PUSCH repetitions 305, and the amounts may be proportional with the quantity of resources in each of the PUSCH 310 of the PUSCH repetition 305 available for carrying piggybacked UCI 335.

In some examples, UE 115-a may determine a resource allocation for the UCI 335 (for example, a total quantity of resources, for each PUSCH 310 of the PUSCH repetition 305, available for carrying the UCI 335), as shown.

$$N_{final} = \min\{N_{tot}, \alpha M_{tot}\} \quad (4)$$

As part of the Equation (4), shown above, α may control a maximum portion of the quantity of resources available for carrying piggybacked UCI 335 for respective PUSCH 310 of the PUSCH repetition 305.

Accordingly, the described techniques avoid repeating encoded UCIs into different repetitions, and instead the described techniques support joint encoding of PUCCH 315 and splitting encoded UCI bits into multiple PUSCH 310 of PUSCH repetition 305. The described techniques may provide efficacy to UE 115-a by reducing or eliminating latencies associated with processes related to collision management schemes for handling collisions between PUSCH repetition 305 and PUCCH 315 transmission. Supported collision management schemes may include features for effectively piggybacking UCI 335 over multiple PUSCH 310.

Figure 4:
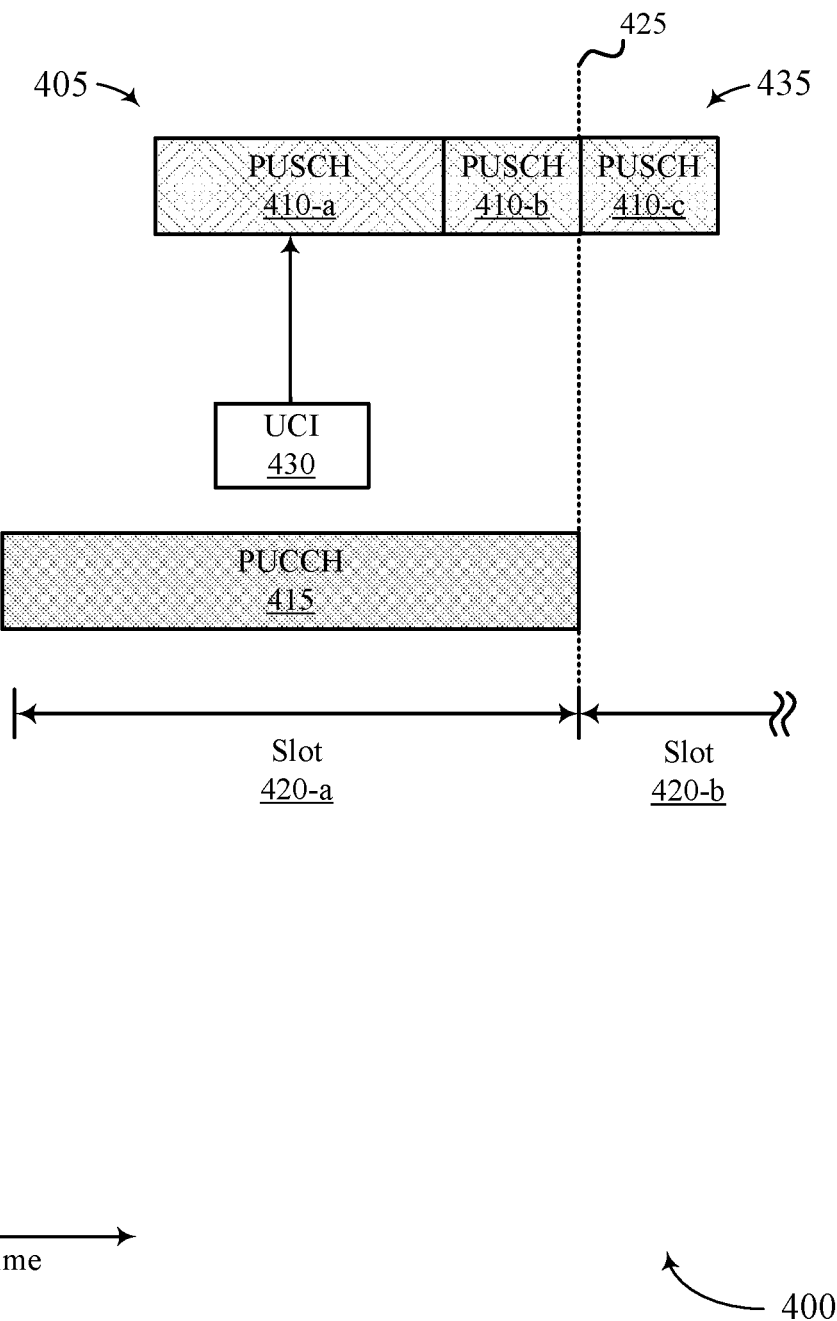

FIG. 4 illustrates an example of a collision management scheme 400 that supports enhanced solutions to handle collisions between PUSCH repetitions and a PUCCH transmission in accordance with aspects of the present disclosure. In some examples, the collision management scheme 300 may implement aspects of the wireless communications systems 100 and 200, as described with reference to FIGS. 1 and 2. For example, the collision management scheme 300 may be based on a configuration by a base station, and implemented by a UE for handling collisions between PUSCH repetitions and a PUCCH transmission, as described with reference to FIGS. 1 and 2.

In the example of FIG. 4, a PUSCH repetition 405 including a PUSCH 410-*a*, a PUSCH 410-*b* and a PUSCH 410-*c*, as well as a PUCCH 415 may span a portion or an entirety of a slot 420. In some examples, the PUSCH 410-*b* and the PUSCH 410-*c* may be a single PUSCH 435. In some examples, the PUSCH 410-*a* and the PUSCH 435 may collide with the PUCCH 415. The slot 420 may span a number of symbols (for example, 14 OFDM symbols). In some examples, the PUSCHs 410 and the PUCCH 415 may occupy time and frequency resources related to the slot 420, which may include symbol periods, subcarriers, and the like. In some examples, the PUSCH 435 may span across a slot boundary 425 associated with the slot 420. As such, in some examples, a portion of the PUSCH 435 may collide with the PUCCH 415. For example, PUSCH 435 may be split into the PUSCH 410-*b* and the PUSCH 410-*c*. In this example, PUSCH 410-*b* may be part of slot 420-*a*, while PUSCH 410-*c* may be part of slot 420-*b*.

With reference to FIG. 2, UE 115-*a* may determine individual quantities of resources to be used by UCI 430 in each PUSCH 410 of the PUSCH repetition 405, and determine a total quantity of resource elements to be used by the UCI 430 based on a sum of individual quantities of resource elements determined for each PUSCH 410 of the PUSCH repetition 405. For example, UE 115-*a* may determine the individual resource allocation used by the UCI 430 in each PUSCH 410 of the PUSCH repetition 405, as shown.

$$N_j = \left\lceil \frac{K_{UCI} \cdot M_j \cdot \beta_{offset}}{K_{data}} \right\rceil \quad (5)$$

As part of the Equation (5), shown above, Nj defines the individual resource allocation used by the UCI 430 in each of PUSCH 410 of the PUSCH repetition 405, $K_{UCI}$ defines the payload size (for example, number of information bits) of the UCI 430 before encoding, Mj defines the total number of resource elements for the PUSCH repetition 405 (for example, PUSCH 405 transmissions excluding DMRS and other reference signals), $K_{data}$ defines a payload size of uplink data before encoding the PUSCHs 410, and $\beta_{offset}$ defines a parameter signaled from base station 105-*a* to UE 115-*a* to indicate a coding ratio between the UCI 430 and uplink data carried in the PUSCH repetition 405. $\beta_{offset}$ may define a ratio of coding rates of uplink data transmission and uplink control transmission. In some examples, the value of $\beta_{offset}$ may be a positive value, and greater than one ($\beta_{offset} > 1$). In some other examples, the effective coding rate for the PUSCHs 410 may be $$\frac{K_{data}}{M_j}.$$

In other examples, it the effective rate in one PUSCH transmission is greater than a threshold, UE 115-*a* may refrain from piggybacking UCI 430 on the corresponding PUSCH 410 (for example, set $N_j$ to zero).

UE 115-*a* may multiplex the UCI 430 on the split individual quantities of resources in each PUSCH 410 of the PUSCH repetition 405. For example, UE 115-*a* may split the total quantity of resources to be used by the encoded UCI 430 into amounts to be included in each PUSCH 410 of the PUSCH repetition 410. The amounts may be based on the individual quantities of resources. In some examples, UE 115-*a* determine the resource allocation for the UCI 430 (for example, a total quantity of resources, for each PUSCH 410 of the PUSCH repetition 405, available for carrying the UCI 430) as shown.

$$N_{final,j} = \min\{N_j, \alpha M_j\} \quad (6)$$

As part of the Equation (6), shown above, α may control a maximum portion of the quantity of resources available for carrying piggybacked UCI 430 for respective PUSCH 410 of the PUSCH repetition 405. In some examples, UE 115-*a* may determine a total number of resources, as shown.

$$N_{final} = \Sigma N_{final,j} \quad (7)$$

The total number of resources determined according to Equation (7) may be used by UE 115-*a* to encode the UCI 430. In some examples, UE 115-*a* may split the encoded UCI bits of UCI 430 into different portions based on the $N_{final}$ determined by Equation (7).

Additionally or alternatively, UE 115-*a* may identify that UCI 430 is scheduled for transmission by UE 115-*a* via PUCCH 415, which may overlap with one or more overlapping PUSCH 410 of the PUSCH repetition 405. UE 115-*a* may determine to multiplex the UCI 430 on one or more selected PUSCH 410 of the PUSCH repetition 450. The one or more selected PUSCH 410 may at least be partially different from the one or more overlapping PUSCH 410 of the PUSCH repetition 405. In some examples, even if the PUCCH 415 collides with one or some of the PUSCH 410 of the PUSCH repetition 405, UE 115-*a* may piggyback the UCI 430 on all PUSCH 410 of the PUSCH repetition 405. In some other examples, UE 115-*a* may multiplex the PUCCH 415 on all PUSCH 410 on and after a first colliding PUSCH 410 (for example, PUSCH 410-*a*). In other examples, UE 115-*a* may multiplex the PUCCH 415 on one overlapping PUSCH 410 that has a maximum number of resource elements (or lowest coding rate). For example, UE 115-*a* may identify one or more largest capacity PUSCH 410 of the PUSCH repetition 405. The one or more largest capacity PUSCH 410 may each include a maximum number of resources available for multiplexing of UCI 430 of all PUSCH 410 of the PUSCH repetition 405. In some examples, if there is a tie between two or more PUSCHs 410, UE 115-*a* may either piggyback on all of the PUSCHs 410 or piggyback on a first PUSCH 410 (for example, PUSCH 410-*a*). In some examples, UE 115-*a* may identify one or more highest effective coding rate repetitions of the PUSCH repetition 405. The one or more highest effective coding rate repetitions each include an effective coding rate above a predetermined threshold. UE 115-*a* may therefore determine to multiplex the UCI 430 on PUSCH 410 of the PUSCH 405 repetition that did not include the one or more highest effective coding rate.

UE 115-*a* may determine to multiplex the UCI 430 only on repetitions of the PUSCH repetition 405 that begin at least a predetermined duration of time after receipt by UE 115-*a* of an uplink grant associated with the UCI 430. UE 115-*a* may determine to multiplex the UCI 430 on only PUSCH 410 repetitions of the PUSCH repetition 405 that are scheduled to be transmitted within a duration of time corresponding to slot 420-*a* of the PUCCH 415. Thus, the PUSCH repetition 405 may be transmitted within the slot 420-*a* of PUCCH 415. In some examples, UE 115-*a* may have three PUSCH 410 scheduled including the PUSCH 410-*a*, the PUSCH 410-*b*, and the PUSCH 410-*c*. In these examples, the PUSCH 410-*a* and the PUSCH 410-*b* may be in slot 420-*a*, while the PUSCH 410-*c* may be in slot 420-*b*.

UE 115-*a* may piggyback UCI 430 on the PUSCH 410-*a* and the PUSCH 410-*b*, but not piggyback on the PUSCH 410-*c* in slot 420-*b*. As such, UE 115-*a* may refrain from piggybacking UCI on PUSCH crossing a slot (for example, no cross slot piggyback). Additionally or alternatively, UE 115-*a* may determine for each of the selected PUSCH 410 of the PUSCH repetition 405, a quantity of resources available for carrying multiplexed UCI 430, and generate encoded UCI 430 by encoding the UCI 430 based on the quantity of resources available in each of the selected PUSCH 410 of the PUSCH repetition 405. UE 115-*a* may allocate portions of the encoded UCI 430 to different ones of the selected PUSCH 410 of the PUSCH repetition 405 for multiplexing, or allocate the encoded UCI 430 proportionally with the quantity of resources in each of the selected PUSCH 410 available for carrying multiplexed UCI 430.

Returning to FIG. 2, UE 115-*a* may transmit UCI piggybacked on PUSCH 210 of the PUSCH repetition 205. Base station 105-*a* may receive different amounts of UCI on the PUSCH repetition 205. Particular aspects of the wireless communications system 200 described herein may be implemented to realize one or more of the following potential advantages. The wireless communications system 200 may provide efficacy to UE 115-*a* by reducing or eliminating latencies associated with processes related to collision management schemes for handling collisions between PUSCH repetitions and a PUCCH transmission. Supported collision management schemes may include features for effectively piggybacking UCI over multiple PUSCHs. More specifically, the described collision management schemes may support improvements to reliability of uplink transmissions, among other advantages.

Figure 5:
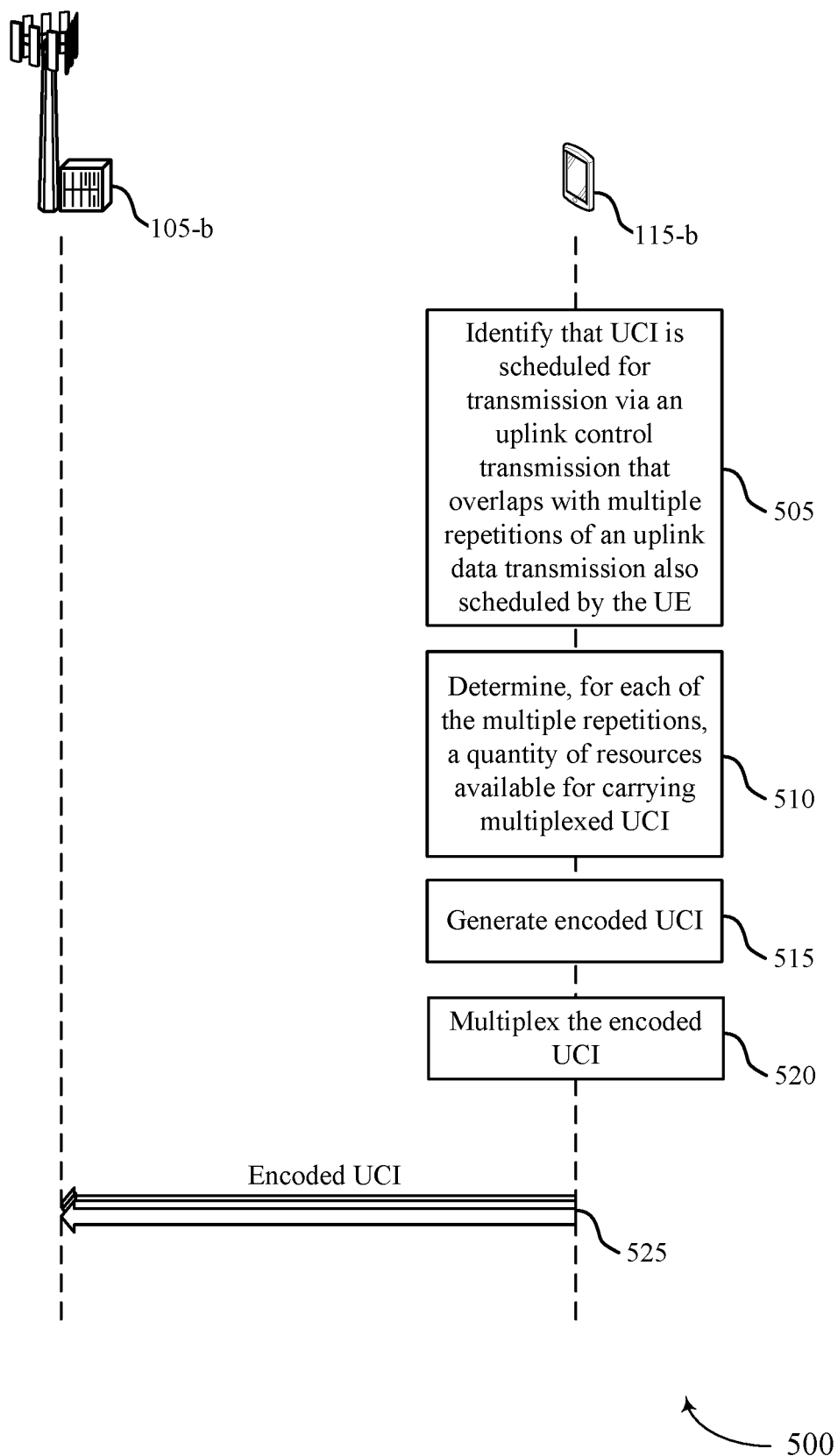
FIG. 5 illustrates an example of a process flow that supports enhanced solutions to handle collisions between PUSCH repetitions and a PUCCH transmission in accordance with aspects of the present disclosure.

FIG. 5 illustrates an example of a process flow 500 that supports enhanced solutions to handle collisions between PUSCH repetitions and a PUCCH transmission in accordance with aspects of the present disclosure. The process flow 500 may implement aspects of the wireless communications systems 100 and 200, as described with reference to FIGS. 1 and 2. For example, the process flow 500 may be based on a configuration by a base station, and implemented by a UE for handling collisions between PUSCH repetitions and a PUCCH transmission, as described with reference to FIGS. 1 and 2.

The process flow 500 may include a base station 105-*b* and a UE 115-*b*, which may be examples of the corresponding devices described with reference to FIGS. 1 and 2. In the following description of the process flow 500, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 500, and other operations may be added to the process flow 500.

At 505, the UE 115-*b* may identify that UCI is scheduled for transmission by the UE 115-*b* via an uplink control transmission (for example, on a PUCCH) that overlaps with multiple repetitions of an uplink data transmission (for example, one or more PUSCHs) also scheduled by the UE 115-*b*. At 510, the UE 115-*b* may determine, for each of the multiple repetitions, a quantity of resources available for carrying multiplexed UCI.

At 515, the UE 115-*b* may generate encoded UCI. For example, the UE 115-*b* may generate encoded UCI by encoding the UCI based on the quantity of resources available in each of the multiple repetitions. The UCI may include at least one of an acknowledgement or negative acknowledgement feedback information or a channel state information (CSI) report. In some examples, the UE 115-*b* may determine a total quantity of resources available in all PUSCH repetitions to be used by the encoded UCI. The total quantity of resources may be based on a payload size of the UCI before encoding, a payload size of uplink data transmission before encoding, a total number of resources available within the multiple repetitions for data transmission, a ratio of coding rates of the uplink data transmission and the uplink control transmission, or a combinations thereof. The total quantity of resources to be used by the encoded UCI may also be determined based on a maximum portion of the total number of resources available within the multiple repetitions for data transmission. In some other examples, the UE 115-*b* may encode the UCI to a number of encoded bits based on the total quantity of resources. The UE 115-*b* may partition the encoded bits proportionally to the quantity of resources in each of the multiple repetitions available for carrying multiplexed UCI.

In some examples, the UE 115-*b* may allocate portions of the encoded UCI to different ones of the multiple repetitions for multiplexing. In some other examples, the UE 115-*b* may allocate the encoded UCI proportionally to the quantity of resources in each of the multiple repetitions available for carrying multiplexed UCI. The UE 115-*b* may therefore split the total quantity of resources to be used by the encoded UCI into amounts to be included in each of the multiple repetitions. The amounts may be proportional to the quantity of resources in each of the multiple repetitions available for carrying multiplexed UCI.

Additionally or alternatively, the UE 115-*b* may determine individual quantities of resources to be used by the encoded UCI in each of the multiple repetitions, and determine a total quantity of resources to be used by the encoded UCI based on a sum of individual quantities of resources determined for each of the multiple repetitions. Here, the UE 115-*b* may encode the UCI to a number of encoded bits based on the total quantity of resources. In some examples, the UE 115-*b* determine the individual quantities of resources based on a payload size of the UCI before encoding, a payload size of uplink data transmission before encoding, a number of resources available for data transmission within a respective repetition of the multiple repetitions, a ratio of coding rates of the uplink data transmission and the uplink control transmission, or combinations thereof. The UE 115-*b* may then split the total quantity of resources to be used by the encoded UCI into amounts to be included in each of the multiple repetitions. The amounts may be based on the individual quantities of resources. In some examples, the UE 115-*b* may partition the encoded bits for inclusion in the multiple repetitions. The encoded bits may be partitioned based on the individual quantities of resources. The total quantity of resources to be used by the encoded UCI may also be determined, for each of the multiple repetitions, based on a maximum portion of the quantity of resources available for carrying multiplexed UCI for respective ones of the multiple repetitions.

At 520, the UE 115-*b* may multiplex the encoded UCI. For example, the UE 115-*b* may multiplex the encoded UCI on at least a portion of the multiple repetitions based on the quantity of resources available in each of the multiple repetition. In some examples, the UE 115-*b* may determine to multiplex the UCI on all repetitions of the set of repetition. In some other examples, the UE 115-*b* may determine to multiplex the UCI on a first of the overlapping repetitions and on all subsequent repetitions of the set of repetitions. In other examples, the UE 115-*b* may determine to multiplex the UCI only on repetitions of the set of repetitions that begin at least a predetermined duration of time after receipt by the UE 115-*b* of an uplink grant associated with the uplink control transmission.

At 525, the process flow 500 may proceed with the UE 115-*b* communicating encoded UCI communications, for examples, such as control information, data, and the like to the base station 105-*b*. The operations performed by the UE 115-*b* as part of, but not limited to, process flow 500 may provide improvements to PUSCH and PUCCH reliability. Furthermore, the operations performed by the UE 115-*b* as part of, but not limited to, process flow 500 may provide benefits and enhancements to the operation of the UE 115-*b*. For example, the described collision management scheme in the process flow 500 may handling collisions between PUSCH repetitions and a PUCCH transmission, among other advantages. The described techniques may also support increased spectral efficiency and, in some examples, may promote low latency communication, among other benefits.

Figure 6:
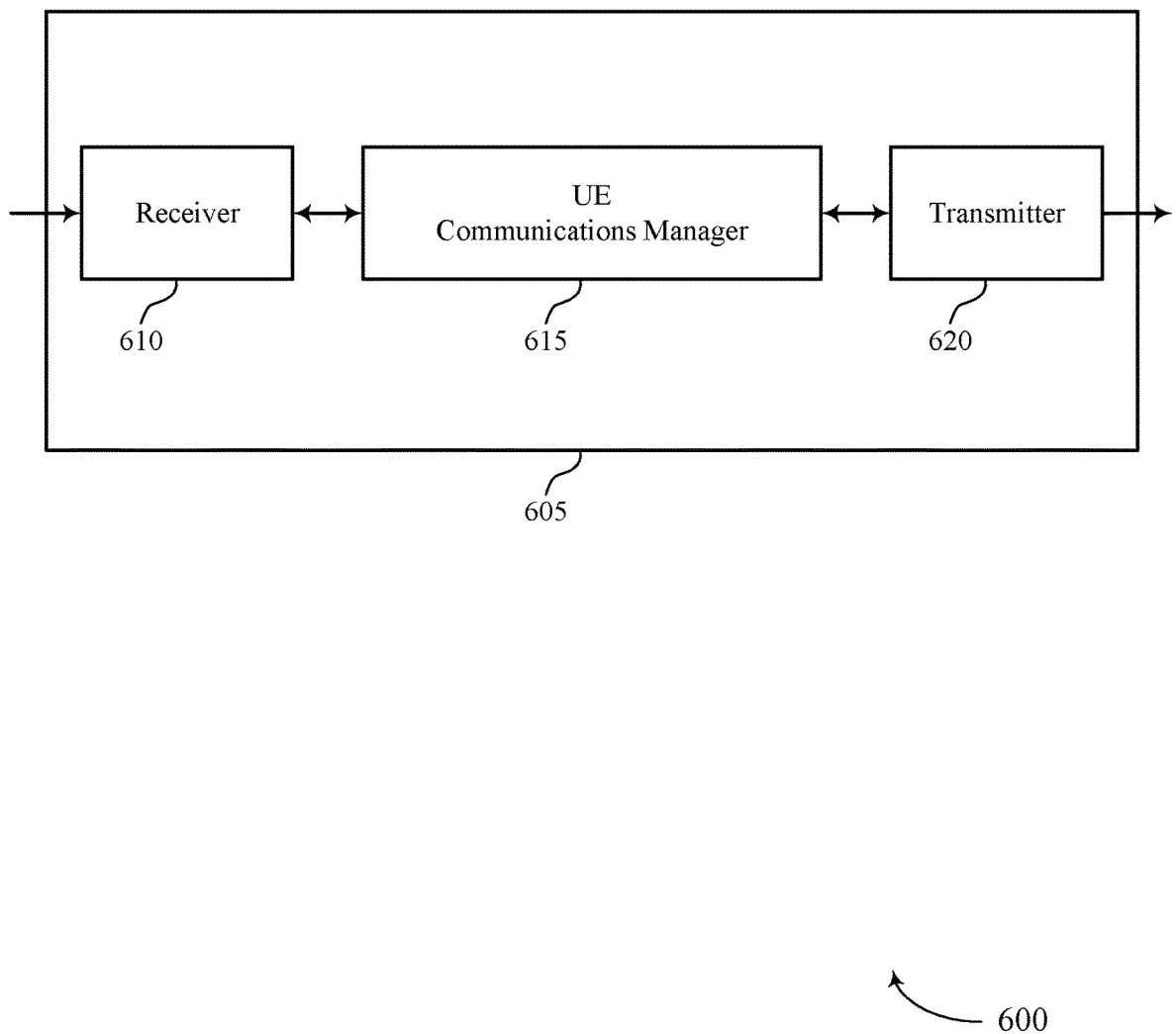
FIGS. 6 and 7 show block diagrams of devices that support enhanced solutions to handle collisions between PUSCH repetitions and a PUCCH transmission in accordance with aspects of the present disclosure.

FIG. 6 shows a block diagram 600 of a device 605 that supports enhanced solutions to handle collisions between PUSCH repetitions and a PUCCH transmission in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (for example, via one or more buses).

The receiver 610 may receive information such as packets, user data, or control information associated with various information channels (for example, control channels, data channels, and information related to enhanced solutions to handle collisions between PUSCH repetitions and a PUCCH transmission, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify that UCI is scheduled for transmission by the device 605 via an uplink control transmission that overlaps with multiple repetitions of an uplink data transmission also scheduled by the device 605, determine, for each of the multiple repetitions, a quantity of resources available for carrying multiplexed UCI, generate encoded UCI by encoding the UCI based on the quantity of resources available in each of the multiple repetitions, and multiplex the encoded UCI on at least a portion of the multiple repetitions based on the quantity of resources available in each of the multiple repetitions. The UE communications manager 615 may also identify that the device 605 is scheduled to transmit a set of repetitions of an uplink data transmission, identify that UCI is scheduled for transmission by the device 605 via an uplink control transmission that overlaps with one or more overlapping repetitions of the set of repetitions, determine to multiplex the UCI on one or more selected repetitions of the set of repetitions, and multiplex the UCI on the one or more selected repetitions. The UE communications manager 615 may be an example of aspects of the UE communications manager 910 described herein.

The UE communications manager 615, or its sub-components, may be implemented in hardware, code (for example, software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
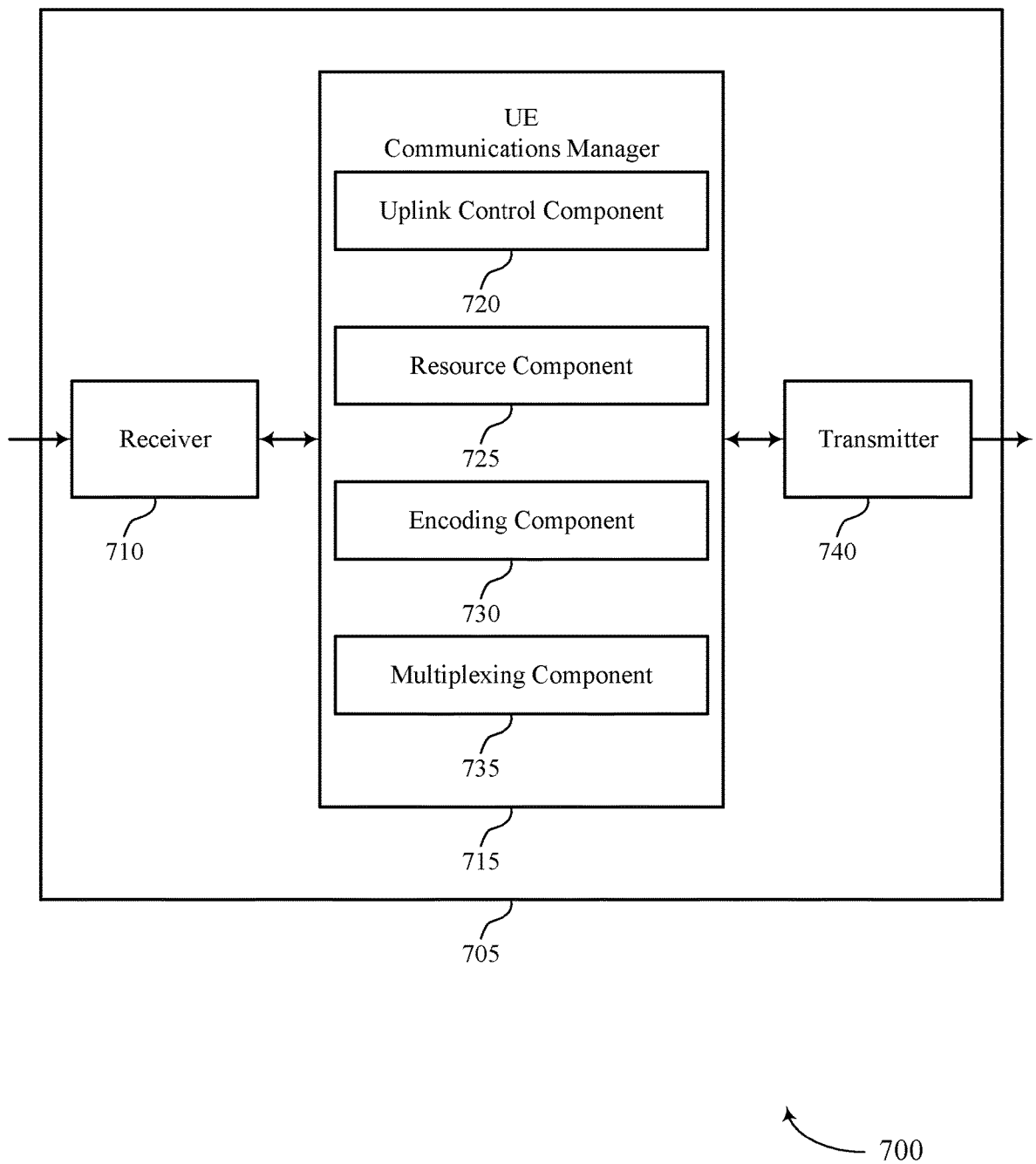

FIG. 7 shows a block diagram 700 of a device 705 that supports enhanced solutions to handle collisions between PUSCH repetitions and a PUCCH transmission in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (for example, via one or more buses).

The receiver 710 may receive information such as packets, user data, or control information associated with various information channels (for example, control channels, data channels, and information related to enhanced solutions to handle collisions between PUSCH repetitions and a PUCCH transmission, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include an uplink control component 720, a resource component 725, an encoding component 730, and a multiplexing component 735. The UE communications manager 715 may be an example of aspects of the UE communications manager 910 described herein.

The uplink control component 720 may identify that UCI is scheduled for transmission by the device 705 via an uplink control transmission that overlaps with multiple repetitions of an uplink data transmission also scheduled by the device 705. The resource component 725 may determine, for each of the multiple repetitions, a quantity of resources available for carrying multiplexed UCI. The encoding component 730 may generate encoded UCI by encoding the UCI based on the quantity of resources available in each of the multiple repetitions. The multiplexing component 735 may multiplex the encoded UCI on at least a portion of the multiple repetitions based on the quantity of resources available in each of the multiple repetitions. Additionally or alternatively, the uplink control component 720 may identify that the device 705 is scheduled to transmit a set of repetitions of an uplink data transmission and identify that UCI is scheduled for transmission by the device 705 via an uplink control transmission that overlaps with one or more overlapping repetitions of the set of repetitions. The multiplexing component 735 may determine to multiplex the UCI on one or more selected repetitions of the set of repetitions, where the one or more selected repetitions are at least partially different from the one or more overlapping repetitions and multiplex the UCI on the one or more selected repetitions.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
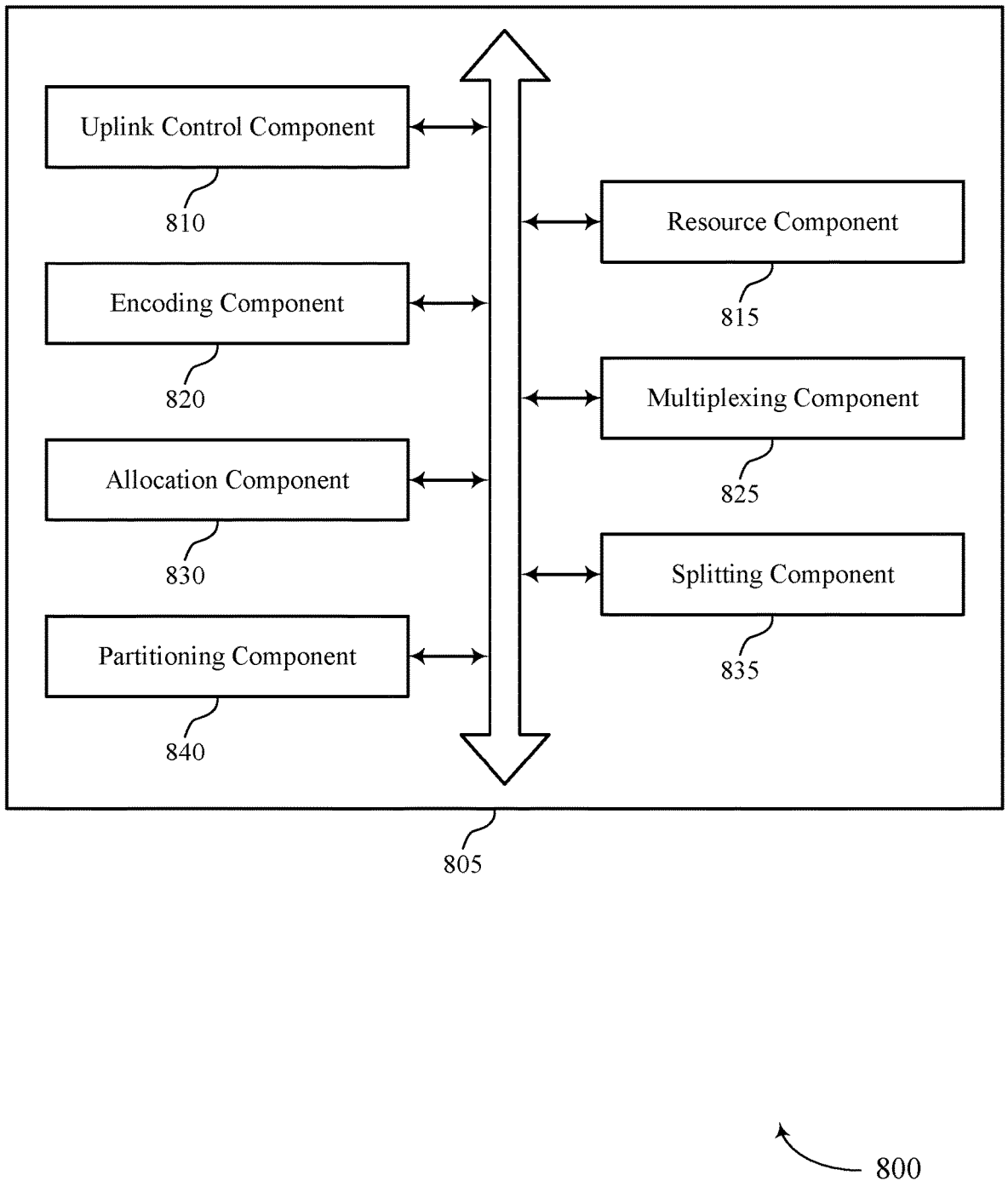
FIG. 8 shows a block diagram of a communications manager that supports enhanced solutions to handle collisions between PUSCH repetitions and a PUCCH transmission in accordance with aspects of the present disclosure.

FIG. 8 shows a block diagram 800 of a UE communications manager 805 that supports enhanced solutions to handle collisions between PUSCH repetitions and a PUCCH transmission in accordance with aspects of the present disclosure. The UE communications manager 805 may be an example of aspects of a UE communications manager 615, a UE communications manager 715, or a UE communications manager 910 described herein. The UE communications manager 805 may include an uplink control component 810, a resource component 815, an encoding component 820, a multiplexing component 825, an allocation component 830, a splitting component 835, and a partitioning component 840. Each of these modules may communicate, directly or indirectly, with one another (for example, via one or more buses).

The uplink control component 810 may identify that UCI is scheduled for transmission by the UE via an uplink control transmission that overlaps with multiple repetitions of an uplink data transmission also scheduled by the UE. In some examples, the uplink control component 810 may identify that the UE is scheduled to transmit a set of repetitions of an uplink data transmission. In some examples, the uplink control component 810 may identify that UCI is scheduled for transmission by the UE via an uplink control transmission that overlaps with one or more overlapping repetitions of the set of repetitions. In some cases, the UCI includes at least one of an acknowledgement or negative acknowledgement feedback information or a CSI report. In some cases, the UCI includes at least an acknowledgement or negative acknowledgement feedback information corresponding to one or more downlink data transmissions scheduled by one or more downlink grants.

The resource component 815 may determine, for each of the multiple repetitions, a quantity of resources available for carrying multiplexed UCI. In some examples, the resource component 815 may determine a total quantity of resources to be used by the encoded UCI, where the total quantity of resources is based on a payload size of the UCI before encoding, a payload size of uplink data transmission before encoding, a total number of resources available within the multiple repetitions for data transmission, a ratio of coding rates of the uplink data transmission and the uplink control transmission, and combinations thereof. In some examples, the resource component 815 may determine individual quantities of resources to be used by the encoded UCI in each of the multiple repetitions. In some examples, the resource component 815 may determine a total quantity of resources to be used by the encoded UCI based on a sum of individual quantities of resources determined for each of the multiple repetitions. In some examples, the resource component 815 may determine the individual quantities of resources based on a payload size of the UCI before encoding, a payload size of uplink data transmission before encoding, a number of resources available for data transmission within a respective repetition of the multiple repetitions, a ratio of coding rates of the uplink data transmission and the uplink control transmission, and combinations thereof.

In some examples, the resource component 815 may determine, for each of the selected repetitions, a quantity of resources available for carrying multiplexed UCI. In some cases, the total quantity of resources to be used by the encoded UCI is also determined based on a maximum portion of the total number of resources available within the multiple repetitions for data transmission. In some cases, the total quantity of resources to be used by the encoded UCI is also determined, for each of the multiple repetitions, based on a maximum portion of the quantity of resources available for carrying multiplexed UCI for respective ones of the multiple repetitions.

The encoding component 820 may generate encoded UCI by encoding the UCI based on the quantity of resources available in each of the multiple repetitions. In some examples, the encoding component 820 may encode the UCI to a number of encoded bits based on the total quantity of resources. In some examples, the encoding component 820 may generate encoded UCI by encoding the UCI based on the quantity of resources available in each of the selected repetitions.

The multiplexing component 825 may multiplex the encoded UCI on at least a portion of the multiple repetitions based on the quantity of resources available in each of the multiple repetitions. In some examples, the multiplexing component 825 may determine to multiplex the UCI on one or more selected repetitions of the set of repetitions, where the one or more selected repetitions are at least partially different from the one or more overlapping repetitions. In some examples, the multiplexing component 825 may multiplex the UCI on the one or more selected repetitions. In some examples, the multiplexing component 825 may determine to multiplex the UCI on all repetitions of the set of repetitions. In some examples, the multiplexing component 825 may determine to multiplex the UCI on a first of the overlapping repetitions and on all subsequent repetitions of the set of repetitions.

In some examples, the multiplexing component 825 may identify one or more largest capacity repetitions of the set of repetitions, where the one or more largest capacity repetitions each include a maximum number of resources available for multiplexing of UCI of all of the set of repetitions. In some examples, the multiplexing component 825 may determine to multiplex the UCI on at least one of the one or more of the largest capacity repetitions. In some examples, the multiplexing component 825 may determine to multiplex the UCI on all of the one or more of the largest capacity repetitions. In some examples, the multiplexing component 825 may determine to multiplex the UCI on only a first of the one or more of the largest capacity repetitions.

In some examples, the multiplexing component 825 may identify one or more largest capacity repetitions of the set of repetitions, where the one or more largest capacity repetitions each include a number of resources available for multiplexing of UCI above a predetermined threshold. In some examples, the multiplexing component 825 may determine to multiplex the UCI on only the one or more of the largest capacity repetitions. In some examples, the multiplexing component 825 may identify one or more highest effective coding rate repetitions of the set of repetitions, where the one or more highest effective coding rate repetitions each include an effective coding rate above a predetermined threshold. In some examples, the multiplexing component 825 may determine to multiplex the UCI on repetitions that did not include the one or more highest effective coding rate repetitions. In some examples, the multiplexing component 825 may determine to multiplex the UCI only on repetitions of the set of repetitions that begin at least a predetermined duration of time after receipt by the UE of an uplink grant associated with the uplink control transmission.

In some examples, the multiplexing component 825 may determine to multiplex the UCI only on repetitions of the set of repetitions that begin at least a second predetermined duration of time after receipt by the UE of a last of the one or more downlink data transmissions. In some examples, the multiplexing component 825 may determine to multiplex the UCI on only repetitions of the set of repetitions that are scheduled to be transmitted within a duration of time corresponding to a slot of the uplink control transmission. In some examples, the multiplexing component 825 may where the UCI that is multiplexed on the one or more selected repetitions is the encoded UCI. The allocation component 830 may allocate portions of the encoded UCI to different ones of the multiple repetitions for multiplexing.

In some examples, the allocation component 830 may allocate the encoded UCI proportionally to the quantity of resources in each of the multiple repetitions available for carrying multiplexed UCI. In some examples, the allocation component 830 may allocate the encoded UCI proportionally to the quantity of resources in each of the selected repetitions available for carrying multiplexed UCI.

The splitting component 835 may split the total quantity of resources to be used by the encoded UCI into amounts to be included in each of the multiple repetitions, where the amounts are proportional to the quantity of resources in each of the multiple repetitions available for carrying multiplexed UCI. In some examples, the splitting component 835 may split the total quantity of resources to be used by the encoded UCI into amounts to be included in each of the multiple repetitions, where the amounts are based on the individual quantities of resources. The partitioning component 840 may partition the encoded bits proportionally to the quantity of resources in each of the multiple repetitions available for carrying multiplexed UCI. In some examples, the partitioning component 840 may partition the encoded bits for inclusion in the multiple repetitions, where the encoded bits are partitioned based on the individual quantities of resources.

Figure 9:
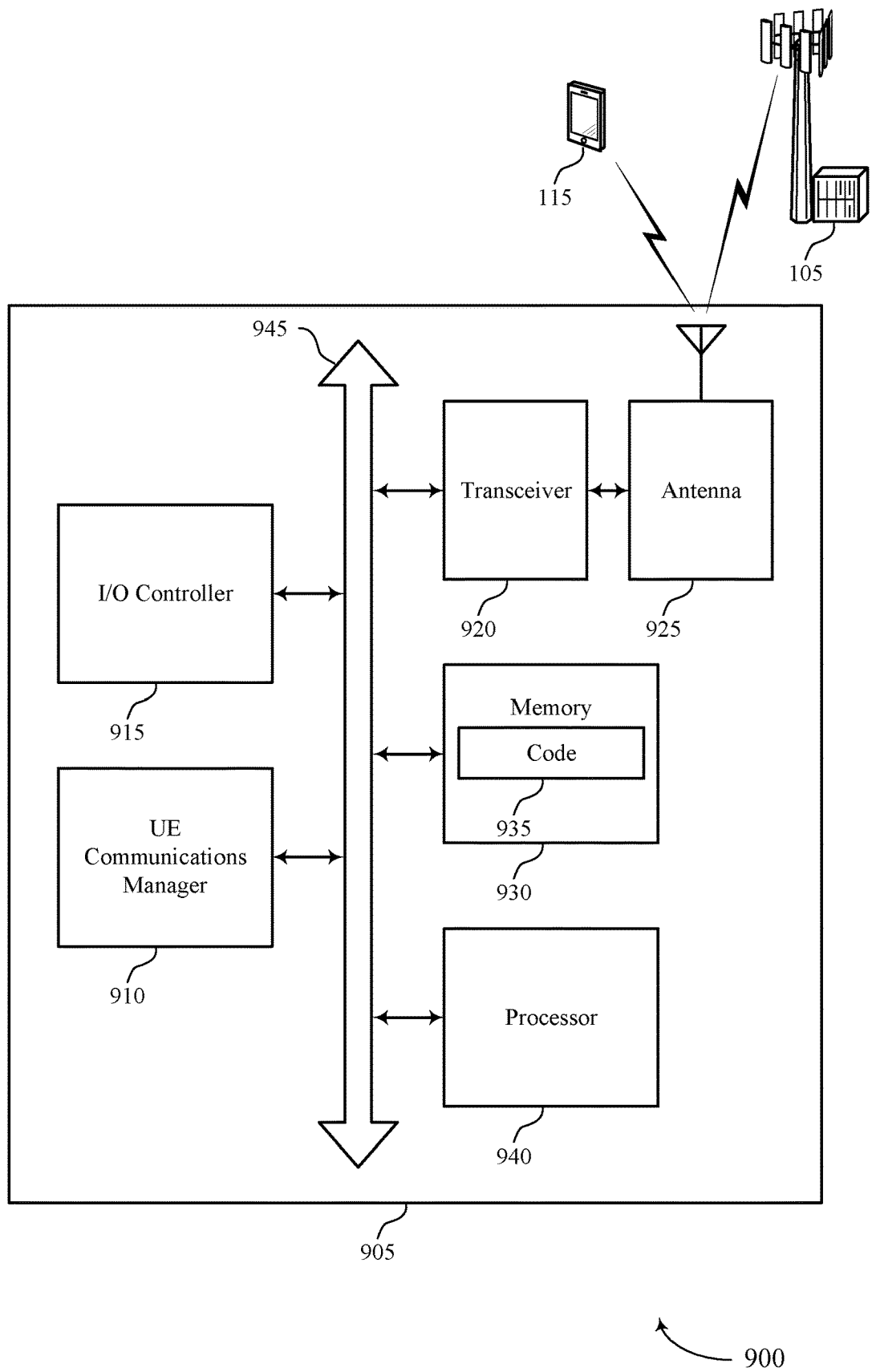
FIG. 9 shows a diagram of a system including a device that supports enhanced solutions to handle collisions between PUSCH repetitions and a PUCCH transmission in accordance with aspects of the present disclosure.

FIG. 9 shows a diagram of a system 900 including a device 905 that supports enhanced solutions to handle collisions between PUSCH repetitions and a PUCCH transmission in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (for example, bus 945).

The UE communications manager 910 may identify that UCI is scheduled for transmission by the UE via an uplink control transmission that overlaps with multiple repetitions of an uplink data transmission also scheduled by the UE, determine, for each of the multiple repetitions, a quantity of resources available for carrying multiplexed UCI, generate encoded UCI by encoding the UCI based on the quantity of resources available in each of the multiple repetitions, and multiplex the encoded UCI on at least a portion of the multiple repetitions based on the quantity of resources available in each of the multiple repetitions. The UE communications manager 910 may also identify that the UE is scheduled to transmit a set of repetitions of an uplink data transmission, identify that UCI is scheduled for transmission by the UE via an uplink control transmission that overlaps with one or more overlapping repetitions of the set of repetitions, determine to multiplex the UCI on one or more selected repetitions of the set of repetitions, and multiplex the UCI on the one or more selected repetitions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (for example, when compiled and executed) to perform functions described herein.

The processor 940 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting enhanced solutions to handle collisions between PUSCH repetitions and a PUCCH transmission).

Figure 10:
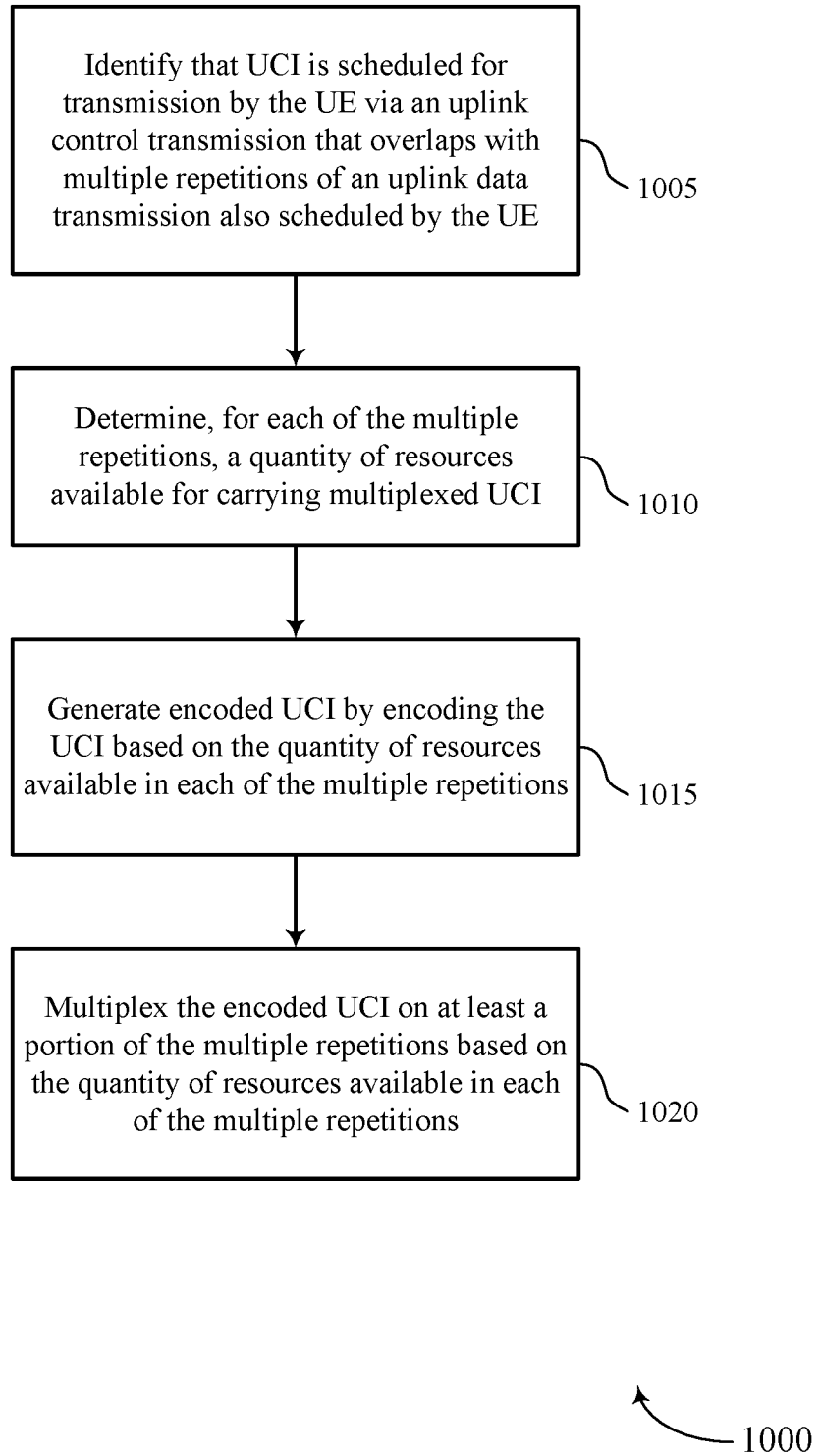
FIGS. 10 through 13 show flowcharts illustrating methods that support enhanced solutions to handle collisions between PUSCH repetitions and a PUCCH transmission in accordance with aspects of the present disclosure.

FIG. 10 shows a flowchart illustrating a method 1000 that supports enhanced solutions to handle collisions between PUSCH repetitions and a PUCCH transmission in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may identify that UCI is scheduled for transmission by the UE via an uplink control transmission that overlaps with multiple repetitions of an uplink data transmission also scheduled by the UE. The operations of 1005 may be performed according to the methods described herein. In some examples, aspects of the operations of 1005 may be performed by an uplink control component as described with reference to FIGS. 6 through 9.

At 1010, the UE may determine, for each of the multiple repetitions, a quantity of resources available for carrying multiplexed UCI. The operations of 1010 may be performed according to the methods described herein. In some examples, aspects of the operations of 1010 may be performed by a resource component as described with reference to FIGS. 6 through 9.

At 1015, the UE may generate encoded UCI by encoding the UCI based on the quantity of resources available in each of the multiple repetitions. The operations of 1015 may be performed according to the methods described herein. In some examples, aspects of the operations of 1015 may be performed by an encoding component as described with reference to FIGS. 6 through 9.

At 1020, the UE may multiplex the encoded UCI on at least a portion of the multiple repetitions based on the quantity of resources available in each of the multiple repetitions. The operations of 1020 may be performed according to the methods described herein. In some examples, aspects of the operations of 1020 may be performed by a multiplexing component as described with reference to FIGS. 6 through 9.

Figure 11:
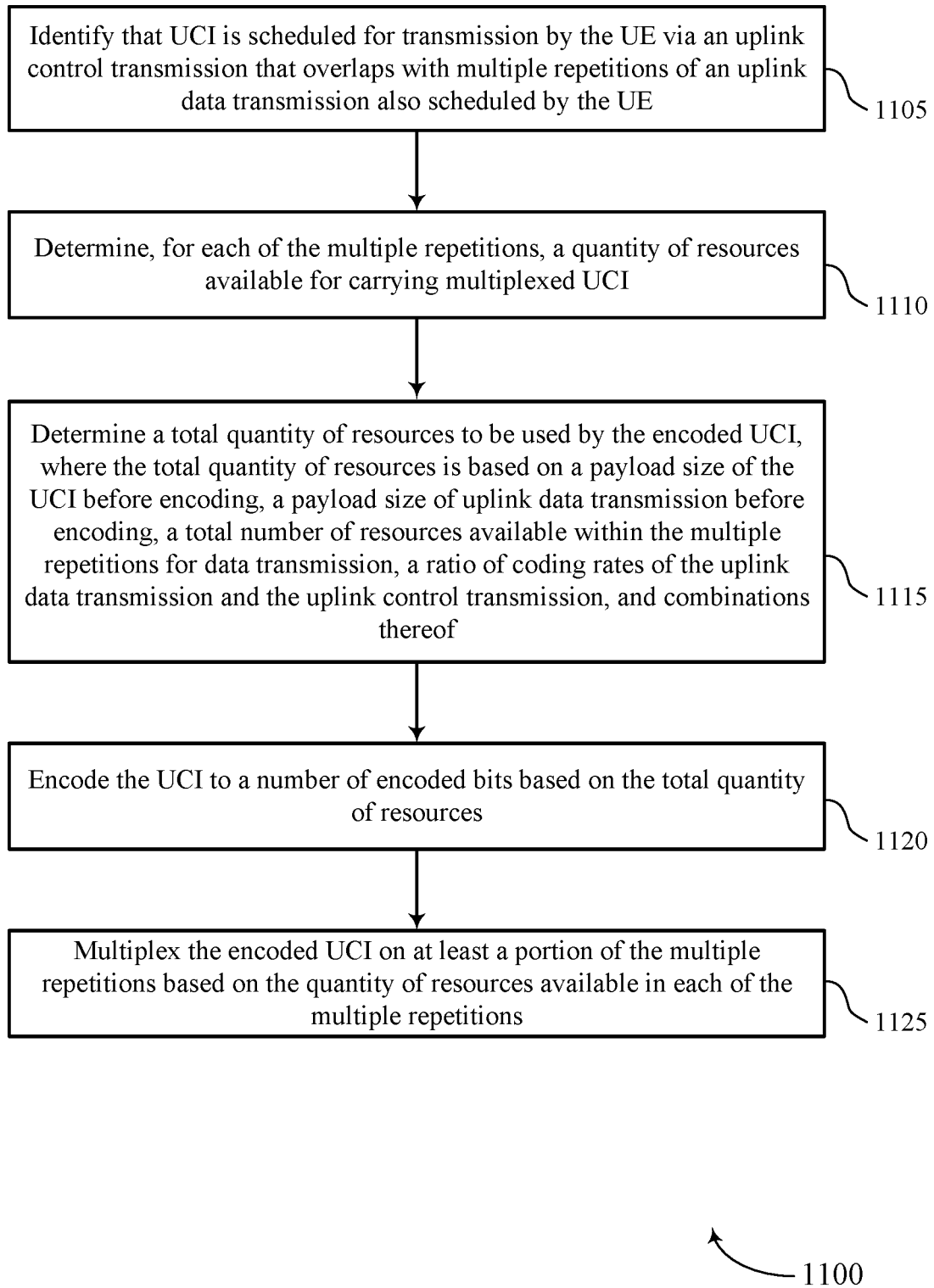

FIG. 11 shows a flowchart illustrating a method 1100 that supports enhanced solutions to handle collisions between PUSCH repetitions and a PUCCH transmission in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may identify that UCI is scheduled for transmission by the UE via an uplink control transmission that overlaps with multiple repetitions of an uplink data transmission also scheduled by the UE. The operations of 1105 may be performed according to the methods described herein. In some examples, aspects of the operations of 1105 may be performed by an uplink control component as described with reference to FIGS. 6 through 9.

At 1110, the UE may determine, for each of the multiple repetitions, a quantity of resources available for carrying multiplexed UCI. The operations of 1110 may be performed according to the methods described herein. In some examples, aspects of the operations of 1110 may be performed by a resource component as described with reference to FIGS. 6 through 9.

At 1115, the UE may determine a total quantity of resources to be used by the encoded UCI, where the total quantity of resources is based on a payload size of the UCI before encoding, a payload size of uplink data transmission before encoding, a total number of resources available within the multiple repetitions for data transmission, a ratio of coding rates of the uplink data transmission and the uplink control transmission, and combinations thereof. The operations of 1115 may be performed according to the methods described herein. In some examples, aspects of the operations of 1115 may be performed by a resource component as described with reference to FIGS. 6 through 9.

At 1120, the UE may encode the UCI to a number of encoded bits based on the total quantity of resources. The operations of 1120 may be performed according to the methods described herein. In some examples, aspects of the operations of 1120 may be performed by an encoding component as described with reference to FIGS. 6 through 9.

At 1125, the UE may multiplex the encoded UCI on at least a portion of the multiple repetitions based on the quantity of resources available in each of the multiple repetitions. The operations of 1125 may be performed according to the methods described herein. In some examples, aspects of the operations of 1125 may be performed by a multiplexing component as described with reference to FIGS. 6 through 9.

Figure 12:
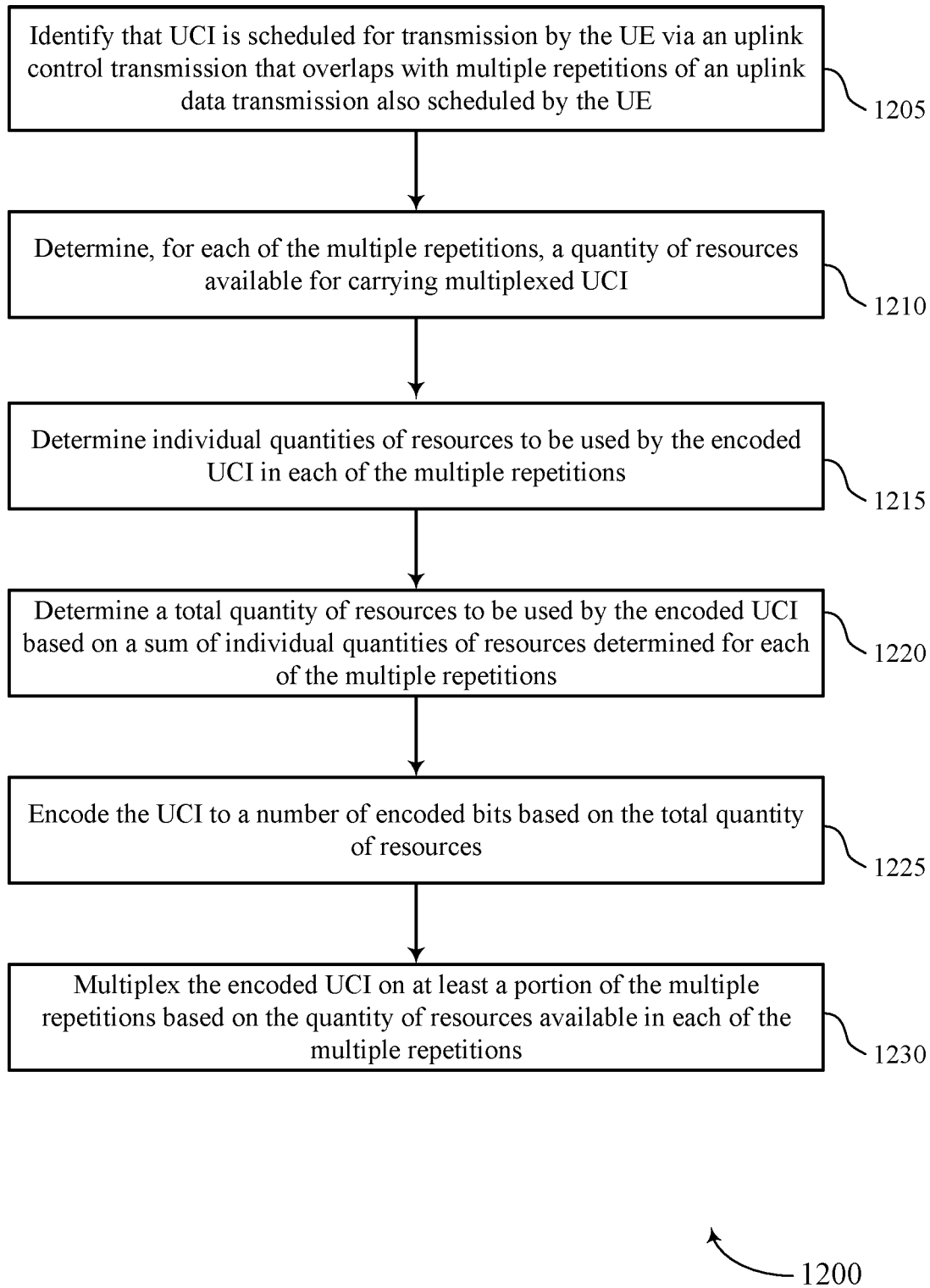

FIG. 12 shows a flowchart illustrating a method 1200 that supports enhanced solutions to handle collisions between PUSCH repetitions and a PUCCH transmission in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may identify that UCI is scheduled for transmission by the UE via an uplink control transmission that overlaps with multiple repetitions of an uplink data transmission also scheduled by the UE. The operations of 1205 may be performed according to the methods described herein. In some examples, aspects of the operations of 1205 may be performed by an uplink control component as described with reference to FIGS. 6 through 9.

At 1210, the UE may determine, for each of the multiple repetitions, a quantity of resources available for carrying multiplexed UCI. The operations of 1210 may be performed according to the methods described herein. In some examples, aspects of the operations of 1210 may be performed by a resource component as described with reference to FIGS. 6 through 9.

At 1215, the UE may determine individual quantities of resources to be used by the encoded UCI in each of the multiple repetitions. The operations of 1215 may be performed according to the methods described herein. In some examples, aspects of the operations of 1215 may be performed by a resource component as described with reference to FIGS. 6 through 9.

At 1220, the UE may determine a total quantity of resources to be used by the encoded UCI based on a sum of individual quantities of resources determined for each of the multiple repetitions. The operations of 1220 may be performed according to the methods described herein. In some examples, aspects of the operations of 1220 may be performed by a resource component as described with reference to FIGS. 6 through 9.

At 1225, the UE may encode the UCI to a number of encoded bits based on the total quantity of resources. The operations of 1225 may be performed according to the methods described herein. In some examples, aspects of the operations of 1225 may be performed by an encoding component as described with reference to FIGS. 6 through 9.

At 1230, the UE may multiplex the encoded UCI on at least a portion of the multiple repetitions based on the quantity of resources available in each of the multiple repetitions. The operations of 1230 may be performed according to the methods described herein. In some examples, aspects of the operations of 1230 may be performed by a multiplexing component as described with reference to FIGS. 6 through 9.

Figure 13:
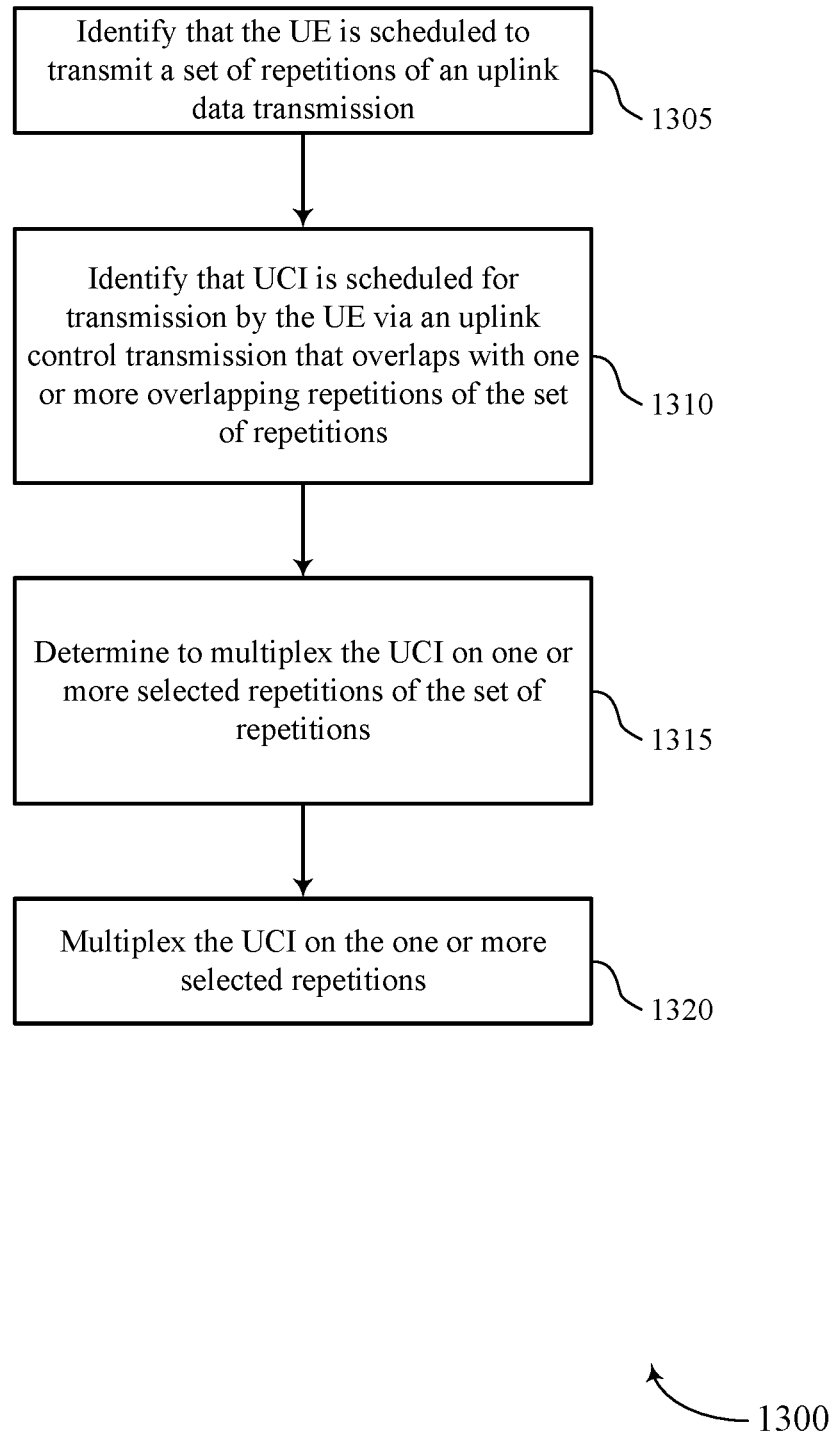

FIG. 13 shows a flowchart illustrating a method 1300 that supports enhanced solutions to handle collisions between PUSCH repetitions and a PUCCH transmission in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may identify that the UE is scheduled to transmit a set of repetitions of an uplink data transmission. The operations of 1305 may be performed according to the methods described herein. In some examples, aspects of the operations of 1305 may be performed by an uplink control component as described with reference to FIGS. 6 through 9.

At 1310, the UE may identify that UCI is scheduled for transmission by the UE via an uplink control transmission that overlaps with one or more overlapping repetitions of the set of repetitions. The operations of 1310 may be performed according to the methods described herein. In some examples, aspects of the operations of 1310 may be performed by an uplink control component as described with reference to FIGS. 6 through 9.

At 1315, the UE may determine to multiplex the UCI on one or more selected repetitions of the set of repetitions. In some cases, the one or more selected repetitions may be at least partially different from the one or more overlapping repetitions. The operations of 1315 may be performed according to the methods described herein. In some examples, aspects of the operations of 1315 may be performed by a multiplexing component as described with reference to FIGS. 6 through 9.

At 1320, the UE may multiplex the UCI on the one or more selected repetitions. The operations of 1320 may be performed according to the methods described herein. In some examples, aspects of the operations of 1320 may be performed by a multiplexing component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying that uplink control information is scheduled for transmission by the UE via an uplink control transmission that overlaps with multiple repetitions of an uplink data transmission, the multiple repetitions being scheduled for transmission by the UE;

determining, for each of the multiple repetitions, a quantity of resources available for carrying uplink control information;

generating encoded uplink control information by encoding the uplink control information based at least in part on the quantity of resources available in each of the multiple repetitions;

multiplexing the encoded uplink control information on at least one of the multiple repetitions based at least in part on the quantity of resources available in each of the multiple repetitions.

2. The method of claim 1, further comprising:

allocating portions of the encoded uplink control information to different ones of the multiple repetitions for multiplexing.

3. The method of claim 2, wherein allocating portions of the encoded uplink control information to different ones of the multiple repetitions comprises:

allocating the encoded uplink control information proportionally to the quantity of resources in each of the multiple repetitions available for carrying uplink control information.

4. The method of claim 1, wherein generating the encoded uplink control information comprises:

determining a total quantity of resources to be used by the encoded uplink control information, wherein the total quantity of resources is based at least in part on a payload size of the uplink control information before encoding, a payload size of uplink data transmission before encoding, a total number of resources available within the multiple repetitions for data transmission, a ratio of coding rates of the uplink data transmission and the uplink control transmission, and combinations thereof.

5. The method of claim 4, wherein generating the encoded uplink control information further comprises:

encoding the uplink control information to a number of encoded bits based at least in part on the total quantity of resources.

6. The method of claim 5, further comprising:

splitting the total quantity of resources to be used by the encoded uplink control information into amounts to be included in each of the multiple repetitions, wherein the amounts are proportional to the quantity of resources in each of the multiple repetitions available for carrying uplink control information.

7. The method of claim 5, further comprising:

partitioning the encoded bits proportionally to the quantity of resources in each of the multiple repetitions available for carrying uplink control information.

8. The method of claim 4, wherein the total quantity of resources to be used by the encoded uplink control information is also determined based on a maximum portion of the total number of resources available within the multiple repetitions for data transmission.

9. The method of claim 1, wherein generating the encoded uplink control information comprises:

determining individual quantities of resources to be used by the encoded uplink control information in each of the multiple repetitions; and determining a total quantity of resources to be used by the encoded uplink control information based at least in part on a sum of individual quantities of resources determined for each of the multiple repetitions.

10. The method of claim 9, wherein generating the encoded uplink control information further comprises:

encoding the uplink control information to a number of encoded bits based at least in part on the total quantity of resources.

11. The method of claim 10, wherein determining the individual quantities of resources to be used by the encoded uplink control information in each of the multiple repetitions comprises:

determining the individual quantities of resources based at least in part on a payload size of the uplink control information before encoding, a payload size of uplink data transmission before encoding, a number of resources available for data transmission within a respective repetition of the multiple repetitions, a ratio of coding rates of the uplink data transmission and the uplink control transmission, and combinations thereof.

12. The method of claim 11, further comprising:

splitting the total quantity of resources to be used by the encoded uplink control information into amounts to be included in each of the multiple repetitions, wherein the amounts are based on the individual quantities of resources.

13. The method of claim 11, further comprising:

partitioning the encoded bits for inclusion in the multiple repetitions, wherein the encoded bits are partitioned based on the individual quantities of resources.

14. The method of claim 9, wherein the total quantity of resources to be used by the encoded uplink control information is also determined, for each of the multiple repetitions, based on a maximum portion of the quantity of resources available for carrying uplink control information for respective ones of the multiple repetitions.

15. A method for wireless communication at a user equipment (UE), comprising:

determining to multiplex uplink control information on one or more selected repetitions of one or more scheduled repetitions of an uplink data transmission based on a capacity of the one or more selected repetitions, wherein the uplink control information is scheduled for transmission, by the UE, via an uplink control transmission, and the uplink control transmission overlaps with at least one of the one or more scheduled repetitions;

multiplexing the uplink control information on the one or more selected repetitions; and transmit the uplink control information.

16. The method of claim 15, wherein the one or more selected repetitions are at least partially different from the one or more scheduled repetitions of the uplink data transmission.

17. The method of claim 15, wherein determining to multiplex the uplink control information on the one or more selected repetitions comprises:

determining to multiplex the uplink control information on all of the one or more scheduled repetitions of the uplink data transmission.

18. The method of claim 15, wherein determining to multiplex the uplink control information on the one or more selected repetitions comprises:

determining to multiplex the uplink control information on a first repetition in time of the one or more selected repetitions of the uplink data transmission.

19. The method of claim 15, wherein determining to multiplex the uplink control information on the one or more selected repetitions comprises:

identifying one or more largest capacity repetitions of the one or more scheduled repetitions of the uplink data transmission, wherein the one or more largest capacity repetitions each include a maximum number of resources available for multiplexing of uplink control information of the one or more scheduled repetitions of the uplink data transmission; and determining to multiplex the uplink control information on at least one of the one or more of the largest capacity repetitions.

20. The method of claim 19, wherein determining to multiplex the uplink control information on at least one of the one or more of the largest capacity repetitions comprises:
determining to multiplex the uplink control information on all of the one or more of the largest capacity repetitions.

21. The method of claim 19, wherein determining to multiplex the uplink control information on at least one of the one or more of the largest capacity repetitions comprises:
determining to multiplex the uplink control information on only a first largest capacity repetition in time of the one or more of the largest capacity repetitions.

22. The method of claim 15, wherein determining to multiplex the uplink control information on the one or more selected repetitions comprises:
identifying one or more largest capacity repetitions of the one or more scheduled repetitions of the uplink data transmission, wherein the one or more largest capacity repetitions each include a number of resources available for multiplexing of uplink control information above a threshold; and
determining to multiplex the uplink control information on only the one or more of the largest capacity repetitions.

23. The method of claim 15, wherein determining to multiplex the uplink control information on the one or more selected repetitions comprises:
identifying one or more highest effective coding rate repetitions of the one or more scheduled repetitions of the uplink data transmission, wherein the one or more highest effective coding rate repetitions each include an effective coding rate above a threshold; and
determining to multiplex the uplink control information on at least one repetition of the one or more selected repetitions that is not included in the one or more highest effective coding rate repetitions.

24. The method of claim 15, wherein determining to multiplex the uplink control information on the one or more selected repetitions comprises:
determining to multiplex the uplink control information only on one or more repetitions of the one or more scheduled repetitions that begin at a duration of time after receipt by the UE of an uplink grant associated with the uplink control transmission.

25. The method of claim 15, wherein determining to multiplex the uplink control information on the one or more selected repetitions comprises:
determining to multiplex the uplink control information on only one or more repetitions of the one or more scheduled repetitions that are scheduled to be transmitted within a duration of time corresponding to a slot of the uplink control transmission.

26. The method of claim 15, further comprising:
determining, for each of the selected repetitions, a quantity of resources available for carrying uplink control information; and
generating encoded uplink control information by encoding the uplink control information based at least in part on the quantity of resources available in each of the selected repetitions,
wherein the uplink control information that is multiplexed on the one or more selected repetitions is the encoded uplink control information.

27. The method of claim 26, further comprising:
allocating portions of the encoded uplink control information to different ones of the selected repetitions for multiplexing.

28. The method of claim 27, wherein allocating portions of the encoded uplink control information to different ones of the selected repetitions comprises:
allocating the encoded uplink control information proportionally to the quantity of resources in each of the selected repetitions available for carrying uplink control information.

29. The method of claim 15, the one or more selected repetitions being based on a number of symbols of the one or more selected repetitions.

30. The method of claim 29, the one or more selected repetitions is one selected repetition.

31. The method of claim 29, the one or more selected repetitions being further based on being first in time.

32. The method of claim 29, the one or more selected repetitions being based on the number of symbols being greater than one symbol.

33. The method of claim 15, the capacity comprising each of the one or more selected repetitions having a number of resources above a threshold.

34. The method of claim 33, the one or more schedule repetitions comprising multiple repetitions in one slot.

35. The method of claim 34, the one or more schedule repetitions crossing a slot boundary of the slot.

36. The method of claim 35, the one or more schedule repetitions comprises a single repetition crossing the slot boundary of the slot.

37. The method of claim 36, wherein determining to multiplex the uplink control information on the one or more selected repetitions comprises:
determining to multiplex the uplink control information on a first repetition in time of the one or more selected repetitions.

38. The method of claim 37, wherein determining to multiplex the uplink control information on the one or more selected repetitions comprises:
determining to multiplex the uplink control information on only the first repetition in time of the one or more selected repetitions.

39. The method of claim 33, wherein determining to multiplex the uplink control information on the one or more selected repetitions comprises:
determining to multiplex the uplink control information on a first repetition in time of the one or more selected repetitions.

40. The method of claim 39, wherein determining to multiplex the uplink control information on the one or more selected repetitions comprises:
determining to multiplex the uplink control information on only the first repetition in time of the one or more selected repetitions.

41. An apparatus for wireless communication, comprising:
a processor,
memory in electronic communication with the processor; and
instructions stored in the memory and executable by the processor to cause the apparatus to:
identify that uplink control information is scheduled for transmission via an uplink control transmission that overlaps with multiple repetitions of an uplink data transmission, the multiple repetitions being scheduled for transmission;

determine, for each of the multiple repetitions, a quantity of resources available for carrying uplink control information;

generate encoded uplink control information by encoding the uplink control information based at least in part on the quantity of resources available in each of the multiple repetitions; and multiplex the encoded uplink control information on at least one of the multiple repetitions based at least in part on the quantity of resources available in each of the multiple repetitions.

42. An apparatus for wireless communication, comprising:

a processor, memory in electronic communication with the processor; and instructions stored in the memory and executable by the processor to cause the apparatus to:

determine to multiplex uplink control information on one or more selected repetitions of one or more scheduled repetitions of an uplink data transmission based on a capacity of the one of more selected repetitions; wherein the uplink control information is scheduled for transmission via an uplink control transmission, and the uplink control transmission overlaps with at least one of the one or more scheduled repetitions;

multiplex the uplink control information on the one or more selected repetitions;

transmit the uplink control information.

43. The apparatus of claim 42, the one or more selected repetitions being based on a number of symbols of the one or more selected repetitions.

44. The apparatus of claim 43, the one or more selected repetitions is one selected repetition.

45. The apparatus of claim 43, the one or more selected repetitions being further based on being first in time.

46. The apparatus of claim 43, the one or more selected repetitions being based on the number of symbols being greater than one symbol.

* * * * *